US009806932B2

(12) United States Patent
Zhang et al.

(10) Patent No.: US 9,806,932 B2
(45) Date of Patent: Oct. 31, 2017

(54) TRANSMISSION METHOD COMPATIBLE WITH HIGHER ORDER MODULATION AND LOWER ORDER MODULATION, AND APPARATUS

(71) Applicant: Huawei Technologies Co., Ltd., Shenzhen (CN)

(72) Inventors: Huaizhi Zhang, Chengdu (CN); Weimin Chen, Chengdu (CN); Xiufeng Wu, Langfang (CN); Qing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/160,810

(22) Filed: May 20, 2016

(65) Prior Publication Data

US 2016/0269218 A1   Sep. 15, 2016

Related U.S. Application Data

(63) Continuation of application No. PCT/CN2014/091840, filed on Nov. 21, 2014.

(30) Foreign Application Priority Data

Nov. 22, 2013   (CN) .......................... 2013 1 0598181

(51) Int. Cl.
*H04L 27/36* (2006.01)
*H04L 27/34* (2006.01)
(Continued)

(52) U.S. Cl.
CPC .......... *H04L 27/362* (2013.01); *H04L 1/0016* (2013.01); *H04L 27/3488* (2013.01);
(Continued)

(58) Field of Classification Search
CPC .. H04L 1/0016; H04L 27/3488; H04L 27/362
See application file for complete search history.

(56) References Cited

U.S. PATENT DOCUMENTS

2009/0109999 A1*   4/2009   Kuri ...................... H04L 1/0003
370/465
2010/0014500 A1   1/2010   Lee et al.
(Continued)

FOREIGN PATENT DOCUMENTS

CN   101272613 A   9/2008
CN   102487314 A   6/2012
(Continued)

OTHER PUBLICATIONS

"3$^{rd}$ Generation Partnership Project; Technical Specification Group Radio Access Network; Evolved Universal Terrestrial Radio Access (E-UTRA); Physical channels and modulation (Release 11)," 3GPP TS 36.211, V11.4.0, pp. 1-120, 3$^{rd}$ Generation Partnership Project, Valbonne, France (Sep. 2013).
(Continued)

*Primary Examiner* — Tuan Pham
(74) *Attorney, Agent, or Firm* — Leydig, Voit & Mayer, Ltd.

(57) ABSTRACT

Disclosed is a transmission method compatible with higher order modulation and lower order modulation, and an apparatus. A base station stores a first higher order modulation mapping table supporting the higher order modulation and a first lower order modulation mapping table supporting the lower order modulation; the base station receives capability level information sent by user equipment; the base station determines, according to the capability level information sent by the user equipment, a first modulation mapping table used to communicate with the user equipment; the base station determines a modulation and coding scheme index according to the modulation mapping table, where the
(Continued)

modulation and coding scheme index is used by the user equipment to determine a modulation and coding scheme; and the modulation and coding scheme index is sent to the user equipment.

18 Claims, 9 Drawing Sheets

(51) Int. Cl.
*H04W 88/08* (2009.01)
*H04L 1/00* (2006.01)

(52) U.S. Cl.
CPC .......... *H04L 1/0003* (2013.01); *H04L 1/0009* (2013.01); *H04L 1/0026* (2013.01); *H04W 88/08* (2013.01)

(56) References Cited

U.S. PATENT DOCUMENTS

| | | | |
|---|---|---|---|
| 2010/0054141 A1* | 3/2010 | Youn | H04H 20/42 370/252 |
| 2011/0096823 A1* | 4/2011 | Sahara | H04L 1/0003 375/225 |
| 2013/0215985 A1* | 8/2013 | Lee, II | H04L 1/0017 375/261 |
| 2013/0343299 A1* | 12/2013 | Sayana | H04B 7/0417 370/329 |

FOREIGN PATENT DOCUMENTS

| | | |
|---|---|---|
| EP | 1845742 A1 | 10/2007 |
| EP | 2811676 A1 | 12/2014 |
| JP | 2009159310 A | 7/2009 |
| JP | 2010517464 A | 5/2010 |
| JP | 2015512213 A | 4/2015 |
| WO | WO 2010086969 A1 | 8/2010 |
| WO | WO 2013123961 A1 | 8/2013 |
| WO | 2013127303 A1 | 9/2013 |

OTHER PUBLICATIONS

"3$^{rd}$ Generation Partnership Project; Technical Specification Group Radio Access Network; Evolved Universal Terrestrial Radio Access (E-UTRA); Multiplexing and channel coding (Release 11)," 3GPP TS 36.212, V11.3.0, pp. 1-84, 3$^{rd}$ Generation Partnership Project, Valbonne, France (Jun. 2013).

"3$^{rd}$ Generation Partnership Project; Technical Specification Group Radio Access Network; Evolved Universal Terrestrial Radio Access (E-UTRA); Physical layer procedures (Release 11)," 3GPP TS 36.213, V11.4.0, pp. 1-182, 3$^{rd}$ Generation Partnership Project, Valbonne, France (Sep. 2013).

"3$^{rd}$ Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.4.0, pp. 1-27, 3$^{rd}$ Generation Partnership Project, Valbonne, France (Sep. 2013).

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.5.0, pp. 1-347, 3$^{rd}$ Generation Partnership Project, Valbonne, France (Sep. 2013).

"On Standard impacts to support 256QAM in downlink," 3GPP TSG RAN WG1 Meeting #75, R1-135655, 3rd Generation Partnership Project, Valbonne, France (Nov. 11-15, 2013).

* cited by examiner

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

FIG. 1

| Higher order modulation mapping table |||||
|---|---|---|---|---|
| MCS Index | Modulation Order || TBS Index ||
| 0 | M0 | 2 | T0 | 0 |
|   |    | 2 |    | 1 |
| 1 | M1 | 2 | T1 | 6 |
|   |    | 4 |    | 9 |
| 2 | M2 || T2 ||
| ... | ... || ... ||
| 9 | M9 || T9 ||
| 10 | M10 || T10 ||
| ... | ... || ... ||
| 16 | M16 || T16 ||
| 17 | M17 || T17 ||
| ... | ... || ... ||
| 30 | M30 || T30 ||
| 31 | M31 || T31 ||

FIG. 5

TRANSMISSION METHOD COMPATIBLE WITH HIGHER ORDER MODULATION AND LOWER ORDER MODULATION, AND APPARATUS

CROSS-REFERENCE TO RELATED APPLICATIONS

This application is a continuation of International Patent Application No. PCT/CN2014/091840, filed on Nov. 21, 2014, which claims priority to Chinese Patent Application No. 201310598181.8, filed on Nov. 22, 2013, both of which are hereby incorporated by reference in their entireties.

TECHNICAL FIELD

The present disclosure relates to the field of communications technologies, and in particular, to a transmission method compatible with higher order modulation and lower order modulation, and an apparatus.

BACKGROUND

A higher order modulation technology is a technology introduced to improve a volume of transmitted data under the premise of not increasing transmission bandwidth. At a present stage, in a Long Time Evolution (LTE) technology, generally, the highest order of the higher order modulation technology is 64 quadrature amplitude modulation (64QAM). With the development of technologies, compared with current 64QAM, a theoretical gain of 256QAM is 33%. In a 256QAM scenario, each resource element (RE) can carry 8 bits of data, and by comparison, in a 64QAM scenario, each RE can carry only 6 bits of data. Therefore, in a same RE scenario, a volume of data that can be transmitted in 256QAM is increased by 33% when compared with a volume of data that can be transmitted in 64QAM.

The 3rd Generation Partnership Project (3GPP) specifies that both a base station side and a user equipment (UE) side store a mapping table. As shown in FIG. 1, the mapping table includes: a modulation and coding scheme (MCS) index (namely, IMCS), a modulation order, and a transport block size index (TBS Index) (namely, ITBS). The base station side notifies the UE by sending the IMCS, so that the UE selects a corresponding modulation order and transport block size index from the mapping table according to the IMCS, and performs subsequent data processing. As can be seen from the mapping table shown in FIG. 1, in the existing 3GPP specification, 256QAM is not supported. In FIG. 1, modulation order numbers 2, 4, and 6 represent QPSK, 16QAM, and 64QAM respectively.

In order to support 256QAM, in an existing technical solution, the mapping table is directly modified, a total quantity of IMCSes in the table shown in FIG. 1 still remains 32, and in the 32 modulation orders, some modulation orders are deleted and replaced by the newly added modulation order: 256QAM, so that the UE can transmit data by using the modulation order: 256QAM.

However, in the prior art, in a case in which the base station side provides a service to UE supporting 256QAM, a compatibility problem of UE not supporting 256QAM is not considered. As a result, in the prior art, a base station cannot provide a service to both the UE supporting 256QAM modulation and the UE not supporting 256QAM modulation; and one of the UEs cannot demodulate data sent by the base station due to an incompatibility issue.

SUMMARY

Embodiments of the present disclosure provide a transmission method compatible with higher order modulation and lower order modulation, and an apparatus, which can compatibly provide a service to UE supporting 256QAM modulation and UE not supporting 256QAM modulation, thereby resolving a problem of incompatibility in the prior art.

A first aspect of the embodiments of the present disclosure provides a transmission method used by a base station to be compatible with higher order modulation and lower order modulation, where the higher order modulation includes 256 quadrature amplitude modulation QAM, the lower order modulation includes at least one of 64QAM, 16QAM, and quadrature phase shift keying QPSK, and the base station stores a first higher order modulation mapping table supporting the higher order modulation and a first lower order modulation mapping table supporting the lower order modulation, and the method includes:

receiving, by the base station, capability level information sent by user equipment, where the capability level information is used to indicate that the user equipment supports the higher order modulation or supports the lower order modulation;

determining, by the base station, according to the capability level information sent by the user equipment, a first modulation mapping table used to communicate with the user equipment, where the first modulation mapping table is the first higher order modulation mapping table or the first lower order modulation mapping table;

determining, by the base station, a modulation and coding scheme index according to the modulation mapping table, where the modulation and coding scheme index is used by the user equipment to determine a modulation and coding scheme; and sending, by the base station, the modulation and coding scheme index to the user equipment.

In a first possible implementation manner of the first aspect of the embodiments of the present disclosure, the determining, by the base station, according to the capability level information sent by the user equipment, a first modulation mapping table used to communicate with the user equipment includes:

when the capability level information indicates that the user equipment supports the higher order modulation, determining, by the base station, that the modulation mapping table is the first higher order modulation mapping table, where the user equipment stores a second higher order modulation mapping table supporting the higher order modulation.

In a second possible implementation manner of the first aspect of the embodiments of the present disclosure, the determining, by the base station, according to the capability level information sent by the user equipment, a first modulation mapping table used to communicate with the user equipment includes:

when the capability level information indicates that the user equipment supports the higher order modulation, and a signal to interference plus noise ratio (SINR) is greater than an SINR threshold, determining, by the base station, that the first modulation mapping table is the first higher order modulation mapping table; or when the capability level information indicates that the user equipment supports the higher order modulation, and a signal to interference plus noise ratio (SINR) is less than an SINR threshold, determining, by the base station, that the first modulation mapping table is the first lower order modulation mapping table, where the user equipment stores a second higher order modulation mapping table supporting the higher order modulation and a second lower order modulation mapping table supporting the lower order modulation.

With reference to the first aspect of the embodiments of the present disclosure or either of the first to second possible implementation manners of the first aspect, in a third possible implementation manner of the first aspect of the embodiments of the present disclosure, when the user equipment stores the second higher order modulation mapping table supporting the higher order modulation and the second lower order modulation mapping table supporting the lower order modulation, the method further includes:

receiving, by the base station, channel quality information reported by the user equipment, where the channel quality information includes a channel quality indicator (CQI); and determining, by the base station, according to the channel quality information, whether to update the first modulation mapping table.

With reference to the third possible implementation manner of the first aspect of the embodiments of the present disclosure, in a fourth possible implementation manner of the first aspect of the embodiments of the present disclosure, the determining, by the base station, according to the channel quality information, whether to update the first modulation mapping table includes:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than a channel quality threshold, determining, by the base station, to update the first modulation mapping table, where an updated first modulation mapping table is the first higher order modulation mapping table.

With reference to the fourth possible implementation manner of the first aspect of the embodiments of the present disclosure, in a fifth possible implementation manner of the first aspect of the embodiments of the present disclosure, the method further includes:

sending, by the base station, first update information to the user equipment, where the first update information is used to instruct the user equipment to update a second modulation mapping table, and the second modulation mapping table is used to communicate with the base station, and is the second higher order modulation mapping table or the second lower order modulation mapping table.

With reference to the first aspect of the embodiments of the present disclosure or either of the first to second possible implementation manners of the first aspect, in a sixth possible implementation manner of the first aspect of the embodiments of the present disclosure, when the user equipment stores the second higher order modulation mapping table supporting the higher order modulation and the second lower order modulation mapping table supporting the lower order modulation, the method further includes:

receiving, by the base station, second update information sent by the user equipment, where the second update information is used to instruct the base station to update the first modulation mapping table.

With reference to either of the fifth to sixth possible implementation manners of the first aspect of the embodiments of the present disclosure, in a seventh possible implementation manner of the first aspect of the embodiments of the present disclosure, the first update information or the second update information is carried by a radio resource control message.

With reference to either of the fifth to sixth possible implementation manners of the first aspect of the embodiments of the present disclosure, in an eighth possible implementation manner of the first aspect of the embodiments of the present disclosure, the first update information is transmitted by using a physical layer downlink control channel.

A second aspect of the embodiments of the present disclosure provides a transmission method used by user equipment, including:

sending, by the user equipment, capability level information to a base station, where the capability level information is used to indicate that the user equipment supports higher order modulation or lower order modulation, where the higher order modulation includes 256 quadrature amplitude modulation QAM, the lower order modulation includes at least one of 64QAM, 16QAM, and quadrature phase shift keying QPSK, and the base station stores a first higher order modulation mapping table supporting the higher order modulation and a first lower order modulation mapping table supporting the lower order modulation;

receiving, by the user equipment, a modulation and coding scheme index sent by the base station, where the modulation and coding scheme index is determined by the base station according to a first modulation mapping table, and the first modulation mapping table is the first higher order modulation mapping table or the first lower order modulation mapping table; and determining, by the user equipment, a second modulation mapping table for communicating with the base station, and determining a modulation and coding scheme according to the second modulation mapping table and the modulation and coding scheme index, where the user equipment stores at least one of a second higher order modulation mapping table supporting the higher order modulation and a second lower order modulation mapping table supporting the lower order modulation, and the second modulation mapping table is the second higher order modulation mapping table or the second lower order modulation mapping table.

In a first possible implementation manner of the second aspect of the embodiments of the present disclosure, when the user equipment stores the second higher order modulation mapping table supporting the higher order modulation, the determining, by the user equipment, a second modulation mapping table for communicating with the base station includes:

using, by the user equipment by default, the second higher order modulation mapping table as the second modulation mapping table.

In a second possible implementation manner of the second aspect of the embodiments of the present disclosure, when the user equipment stores the second higher order modulation mapping table supporting the higher order modulation and the second lower order modulation mapping table supporting the lower order modulation, the determining, by the user equipment, a second modulation mapping table for communicating with the base station includes:

when a signal to interference plus noise ratio (SINR) is greater than an SINR threshold, determining, by the user equipment, that the second modulation mapping table is the second higher order modulation mapping table; or when a signal to interference plus noise ratio (SINR) is less than an SINR threshold, determining, by the user equipment, that the second modulation mapping table is the second lower order modulation mapping table.

With reference to the second aspect of the embodiments of the present disclosure or either of the first to second possible implementation manners of the second aspect, in a third possible implementation manner of the second aspect of the embodiments of the present disclosure, when the user equipment stores the second higher order modulation mapping table supporting the higher order modulation and the second lower order modulation mapping table supporting the lower order modulation, the method further includes:

sending, by the user equipment, channel quality information to the base station, where the channel quality information is used by the base station to determine whether to update the first modulation mapping table, and the channel quality information includes a channel quality indicator (CQI).

With reference to the third possible implementation manner of the second aspect of the embodiments of the present disclosure, in a fourth possible implementation manner of the second aspect of the embodiments of the present disclosure, the method further includes:

receiving, by the user equipment, first update information sent by the base station, and updating the second modulation mapping table according to the first update information.

With reference to the second aspect of the embodiments of the present disclosure or either of the first to second possible implementation manners of the second aspect, in a fifth possible implementation manner of the second aspect of the embodiments of the present disclosure, when the user equipment stores the second higher order modulation mapping table supporting the higher order modulation and the second lower order modulation mapping table supporting the lower order modulation, the method further includes:

determining, by the user equipment, channel quality information, where the channel quality information includes a channel quality indicator; and determining, by the user equipment, according to the channel quality information, whether to update the second modulation mapping table.

With reference to the fifth possible implementation manner of the second aspect of the embodiments of the present disclosure, in a sixth possible implementation manner of the second aspect of the embodiments of the present disclosure, the determining, by the user equipment, according to the channel quality information, whether to update the second modulation mapping table includes:

when the second modulation mapping table is the second higher order modulation mapping table, and the channel quality information is less than a channel quality threshold, determining, by the user equipment, to update the second modulation mapping table, where an updated second modulation mapping table is the second lower order modulation mapping table; or when the second modulation mapping table is the second lower order modulation mapping table, and the channel quality information is greater than a channel quality threshold, determining, by the user equipment, to update the second modulation mapping table, where an updated second modulation mapping table is the second higher order modulation mapping table.

With reference to the sixth possible implementation manner of the second aspect of the embodiments of the present disclosure, in a seventh possible implementation manner of the second aspect of the embodiments of the present disclosure, the method further includes:

sending, by the user equipment, second update information to the base station, where the second update information is used to instruct the base station to update the first modulation mapping table.

With reference to the fourth possible implementation manner of the second aspect of the embodiments of the present disclosure or the seventh possible implementation manner of the second aspect, in an eighth possible implementation manner of the second aspect of the embodiments of the present disclosure, the first update information or the second update information is carried by a radio resource control message.

With reference to the fourth possible implementation manner of the second aspect of the embodiments of the present disclosure or the seventh possible implementation manner of the second aspect, in a ninth possible implementation manner of the second aspect of the embodiments of the present disclosure, the first update information is transmitted by using a physical layer downlink control channel.

A third aspect of the embodiments of the present disclosure provides a base station, where higher order modulation includes 256 quadrature amplitude modulation QAM, and lower order modulation includes at least one of 64QAM, 16QAM, and quadrature phase shift keying QPSK, and the base station includes:

a first receiving unit, a determining unit, a first sending unit, and a first storage unit, where the first receiving unit is configured to receive capability level information sent by user equipment, where the capability level information is used to indicate that the user equipment supports the higher order modulation or supports the lower order modulation;

the determining unit is configured to determine, according to the capability level information sent by the user equipment, a first modulation mapping table used to communicate with the user equipment, where the first modulation mapping table is the first higher order modulation mapping table or the first lower order modulation mapping table;

the determining unit is further configured to determine a modulation and coding scheme index according to the modulation mapping table, where the modulation and coding scheme index is used by the user equipment to determine a modulation and coding scheme;

the first sending unit is configured to send the modulation and coding scheme index to the user equipment; and the first storage unit is configured to store a first higher order modulation mapping table supporting the higher order modulation and a first lower order modulation mapping table supporting the lower order modulation.

In a first possible implementation manner of the third aspect of the embodiments of the present disclosure, the determining, by the determining unit, according to the capability level information sent by the user equipment, a first modulation mapping table used to communicate with the user equipment includes:

when the capability level information indicates that the user equipment supports the higher order modulation, determining, by the base station, that the modulation mapping table is the first higher order modulation mapping table, where the user equipment stores a second higher order modulation mapping table supporting the higher order modulation.

In a second possible implementation manner of the third aspect of the embodiments of the present disclosure, the determining, by the determining unit, according to the capability level information sent by the user equipment, a first modulation mapping table used to communicate with the user equipment includes:

when the capability level information indicates that the user equipment supports the higher order modulation, and a signal to interference plus noise ratio (SINR) is greater than an SINR threshold, determining, by the base station, that the first modulation mapping table is the first higher order modulation mapping table; or when the capability level information indicates that the user equipment supports the higher order modulation, and a signal to interference plus noise ratio (SINR) is less than an SINR threshold, determining, by the base station, that the first modulation mapping table is the first lower order modulation mapping table, where the user equipment stores a second higher order modulation mapping table supporting the higher order modulation and a second lower order modulation mapping table supporting the lower order modulation.

With reference to the third aspect of the embodiments of the present disclosure or either of the first to second possible implementation manners of the third aspect, in a third possible implementation manner of the third aspect of the embodiments of the present disclosure, when the user equipment stores the second higher order modulation mapping table supporting the higher order modulation and the second lower order modulation mapping table supporting the lower order modulation, the first receiving unit is further configured to receive channel quality information reported by the user equipment, where the channel quality information includes a channel quality indicator (CQI); and the determining unit is further configured to determine, according to the channel quality information, whether to update the first modulation mapping table.

With reference to the third possible implementation manner of the third aspect of the embodiments of the present disclosure, in a fourth possible implementation manner of the third aspect of the embodiments of the present disclosure, the determining, by the determining unit, according to the channel quality information, whether to update the first modulation mapping table includes:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than a channel quality threshold, determining, by the base station, to update the first modulation mapping table, where an updated first modulation mapping table is the first higher order modulation mapping table.

With reference to the fourth possible implementation manner of the third aspect of the embodiments of the present disclosure, in a fifth possible implementation manner of the third aspect of the embodiments of the present disclosure, the first sending unit is further configured to send first update information to the user equipment, where the first update information is used to instruct the user equipment to update a second modulation mapping table, and the second modulation mapping table is used to communicate with the base station, and is the second higher order modulation mapping table or the second lower order modulation mapping table.

With reference to the third aspect of the embodiments of the present disclosure or either of the first to second possible implementation manners of the third aspect, in a sixth possible implementation manner of the third aspect of the embodiments of the present disclosure, when the user equipment stores the second higher order modulation mapping table supporting the higher order modulation and the second lower order modulation mapping table supporting the lower order modulation, the first receiving unit is further configured to receive second update information sent by the user equipment, where the second update information is used to instruct the base station to update the first modulation mapping table.

With reference to the fifth possible implementation manner of the third aspect of the embodiments of the present disclosure or the sixth possible implementation manner of the third aspect of the embodiments of the present disclosure, in a seventh possible implementation manner of the third aspect of the embodiments of the present disclosure, the first update information or the second update information is carried by a radio resource control message.

With reference to the fifth possible implementation manner of the third aspect of the embodiments of the present disclosure or the sixth possible implementation manner of the third aspect of the embodiments of the present disclosure, in an eighth possible implementation manner of the third aspect of the embodiments of the present disclosure, the first update information is transmitted by using a physical layer downlink control channel.

A fourth aspect of the embodiments of the present disclosure provides user equipment, including: a second sending unit, a second receiving unit, a second determining unit, and a second storage unit, where the second sending unit is configured to send capability level information to a base station, where the capability level information is used to indicate that the user equipment supports higher order modulation or lower order modulation, where the higher order modulation includes 256 quadrature amplitude modulation QAM, the lower order modulation includes at least one of 64QAM, 16QAM, and quadrature phase shift keying QPSK, and the base station stores a first higher order modulation mapping table supporting the higher order modulation and a first lower order modulation mapping table supporting the lower order modulation;

the second receiving unit is configured to receive a modulation and coding scheme index sent by the base station, where the modulation and coding scheme index is determined by the base station according to a first modulation mapping table, and the first modulation mapping table is the first higher order modulation mapping table or the first lower order modulation mapping table;

the second determining unit is configured to determine a second modulation mapping table for communicating with the base station, and determine a modulation and coding scheme according to the second modulation mapping table and the modulation and coding scheme index; and the second storage unit is configured to store at least one of a second higher order modulation mapping table supporting the higher order modulation and a second lower order modulation mapping table supporting the lower order modulation, where the second modulation mapping table is the second higher order modulation mapping table or the second lower order modulation mapping table.

In a first possible implementation manner of the fourth aspect of the embodiments of the present disclosure, when the user equipment stores the second higher order modulation mapping table supporting the higher order modulation, the determining, by the second determining unit, a second modulation mapping table for communicating with the base station includes:

using, by default, the second higher order modulation mapping table as the second modulation mapping table.

In a second possible implementation manner of the fourth aspect of the embodiments of the present disclosure, when the user equipment stores the second higher order modulation mapping table supporting the higher order modulation and the second lower order modulation mapping table supporting the lower order modulation, the determining, by the second determining unit, a second modulation mapping table for communicating with the base station includes:

when a signal to interference plus noise ratio (SINR) is greater than an SINR threshold, determining, by the user equipment, that the second modulation mapping table is the second higher order modulation mapping table; or when a signal to interference plus noise ratio (SINR) is less than an SINR threshold, determining, by the user equipment, that the second modulation mapping table is the second lower order modulation mapping table.

With reference to the fourth aspect of the embodiments of the present disclosure or either of the first to second possible implementation manners of the fourth aspect, in a third possible implementation manner of the fourth aspect of the embodiments of the present disclosure, when the second storage unit stores the second higher order modulation mapping table supporting the higher order modulation and the second lower order modulation mapping table supporting the lower order modulation, the second sending unit is further configured to send channel quality information to the base station, where the channel quality information is used by the base station to determine whether to update the first modulation mapping table, and the channel quality information includes a channel quality indicator (CQI).

With reference to the third possible implementation manner of the fourth aspect of the embodiments of the present disclosure, in a fourth possible implementation manner of the fourth aspect of the embodiments of the present disclosure, the second receiving unit is further configured to receive first update information sent by the base station; and the user equipment further includes: an updating unit, configured to update the second modulation mapping table according to the first update information.

With reference to the fourth aspect of the embodiments of the present disclosure or either of the first to second possible implementation manners of the fourth aspect, in a fifth possible implementation manner of the fourth aspect of the embodiments of the present disclosure, when the second storage unit stores the second higher order modulation mapping table supporting the higher order modulation and the second lower order modulation mapping table supporting the lower order modulation, the second determining unit is further configured to determine channel quality information, where the channel quality information includes a channel quality indicator; and determine, according to the channel quality information, whether to update the second modulation mapping table.

With reference to the fifth possible implementation manner of the fourth aspect of the embodiments of the present disclosure, in a sixth possible implementation manner of the fourth aspect of the embodiments of the present disclosure, the determining, by the second determining unit, according to the channel quality information, whether to update the second modulation mapping table includes:

when the second modulation mapping table is the second higher order modulation mapping table, and the channel quality information is less than a channel quality threshold, determining, by the user equipment, to update the second modulation mapping table, where an updated second modulation mapping table is the second lower order modulation mapping table; or when the second modulation mapping table is the second lower order modulation mapping table, and the channel quality information is greater than a channel quality threshold, determining, by the user equipment, to update the second modulation mapping table, where an updated second modulation mapping table is the second higher order modulation mapping table.

With reference to the sixth possible implementation manner of the fourth aspect of the embodiments of the present disclosure, in a seventh possible implementation manner of the fourth aspect of the embodiments of the present disclosure, the second sending unit is further configured to send second update information to the base station, where the second update information is used to instruct the base station to update the first modulation mapping table.

With reference to the fourth possible implementation manner of the fourth aspect of the embodiments of the present disclosure or the seventh possible implementation manner of the fourth aspect of the embodiments of the present disclosure, in an eighth possible implementation manner of the fourth aspect of the embodiments of the present disclosure, the first update information or the second update information is carried by a radio resource control message.

With reference to the fourth possible implementation manner of the fourth aspect of the embodiments of the present disclosure or the seventh possible implementation manner of the fourth aspect of the embodiments of the present disclosure, in a ninth possible implementation manner of the fourth aspect of the embodiments of the present disclosure, the first update information is transmitted by using a physical layer downlink control channel.

As can be seen from the foregoing technical solutions, in the embodiments of the present disclosure, a base station stores a first higher order modulation mapping table supporting the higher order modulation and a first lower order modulation mapping table supporting the lower order modulation; the base station receives capability level information sent by user equipment; the base station determines, according to the capability level information sent by the user equipment, a first modulation mapping table used to communicate with the user equipment; the base station determines a modulation and coding scheme index according to the modulation mapping table, where the modulation and coding scheme index is used by the user equipment to determine a modulation and coding scheme; and the modulation and coding scheme index is sent to the user equipment. Therefore, according to the technical solutions provided in the embodiments of the present disclosure, a base station can compatibly provide a service to UE supporting 256QAM modulation and UE not supporting 256QAM modulation, thereby overcoming a problem of incompatibility of a base station in the prior art.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 1 is an example of a mapping table in the prior art;

FIG. 5 is an example of a mapping table according to an embodiment of the present disclosure;

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a transmission method compatible with higher order modulation and lower order modulation, and an apparatus, and the technical solutions mainly involve a network apparatus (such as a base station) and user equipment. The base station may be a device that communicates with the user equipment ("UE" for short) or another communications site such as a relay site. The base station may provide communication coverage for a particular geographic area. For example, the base station may be specifically a node B (Node B, "NB" for short) in UMTS, or may be an evolved node B (Evolutional Node B, "ENB" or "eNode B" for short) in LTE or LTE-A, or may be another access network device, in a wireless communications network, for providing an access service, which is not limited in the embodiments of the present disclosure. The UE may be referred to as a terminal, a mobile station, a subscriber unit, a station, or the like. For example, the UE may be specifically a cellular phone, a personal digital assistant ("PDA" for short), a wireless modem, a wireless communications device, a handheld device, a laptop computer, a cordless phone, or the like. The following uses an eNB as an example for description.

The embodiments of the present disclosure are described in detail below with reference to specific embodiments.

Embodiment 1

Figure 2:
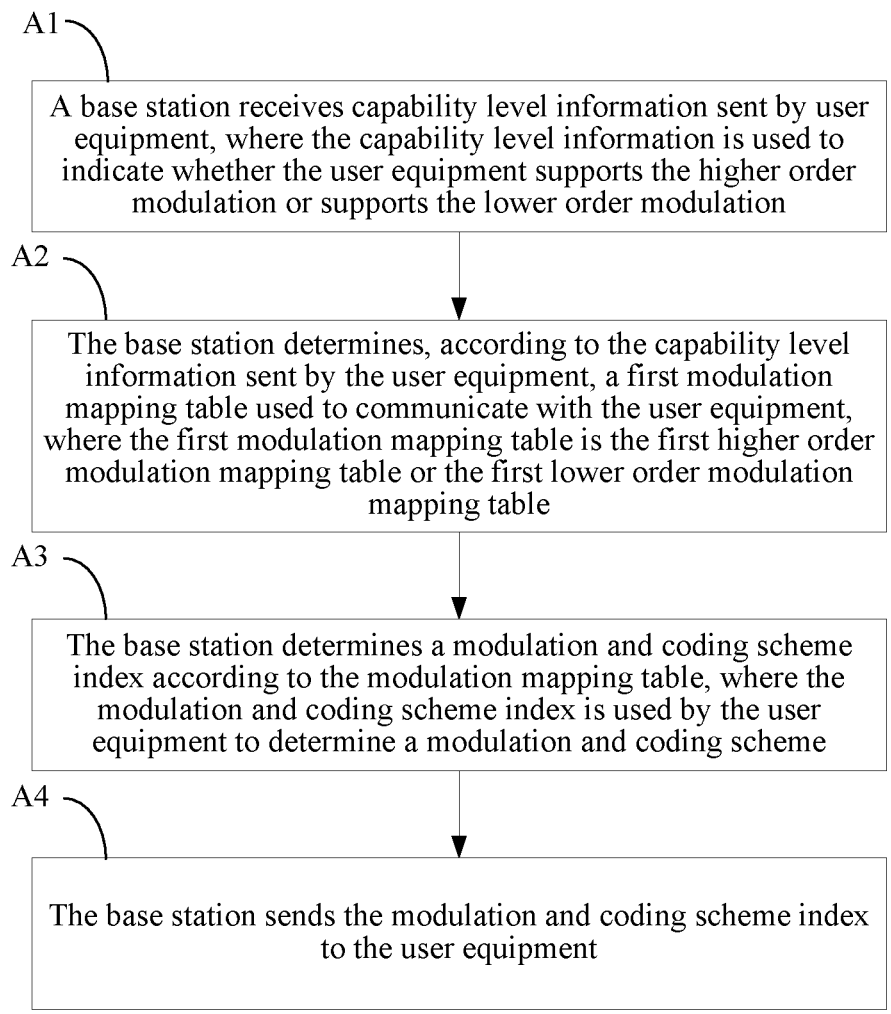
FIG. 2 is a simple schematic flowchart of a transmission method compatible with higher order modulation and lower order modulation according to Embodiment 1 of the present disclosure.

This embodiment of the present disclosure provides a transmission method compatible with higher order modulation and lower order modulation. As shown in FIG. 2, the higher order modulation in the method includes 256 quadrature amplitude modulation QAM, and the lower order modulation includes at least one of 64QAM, 16QAM, and quadrature phase shift keying QPSK, a base station stores a first higher order modulation mapping table supporting the higher order modulation and a first lower order modulation mapping table supporting the lower order modulation, and the method includes:

Step A1: A base station receives capability level information sent by user equipment, where the capability level information is used to indicate that the user equipment supports the higher order modulation or supports the lower order modulation.

The capability level information may be sent to an eNB in a network connecting phase of the UE, but this embodiment does not limit that a moment of receiving the capability level information is the network connecting phase of the UE, and the capability level information may be received in another process.

Step A2: The base station determines, according to the capability level information sent by the user equipment, a first modulation mapping table used to communicate with the user equipment, where the first modulation mapping table is the first higher order modulation mapping table or the first lower order modulation mapping table.

It should be noted that, the first higher order modulation mapping table may refer to a mapping table supporting 256QAM that is stored in the base station and described in subsequent embodiments; and the first lower order modulation mapping table may refer to a mapping table not supporting 256QAM that is stored in the base station and described in subsequent embodiments.

A specific implementation manner of step A2 may be: when the capability level information indicates that the user equipment supports the higher order modulation, determining, by the base station, that the modulation mapping table is the first higher order modulation mapping table, where the user equipment stores a second higher order modulation mapping table supporting the higher order modulation.

Another specific implementation manner of step A2 may also be:

when the capability level information indicates that the user equipment supports the higher order modulation, and a signal to interference plus noise ratio (SINR) is greater than (or equal to) an SINR threshold, determining, by the base station, that the first modulation mapping table is the first higher order modulation mapping table; or when the capability level information indicates that the user equipment supports the higher order modulation, and a signal to interference plus noise ratio (SINR) is less than an SINR threshold, determining, by the base station, that the first modulation mapping table is the first lower order modulation mapping table, where the user equipment stores a second higher order modulation mapping table supporting the higher order modulation and a second lower order modulation mapping table supporting the lower order modulation.

The specific implementation manners of the foregoing step A2 are described in subsequent embodiments with reference to specific embodiments.

Step A3: The base station determines a modulation and coding scheme index according to the modulation mapping table, where the modulation and coding scheme index is used by the user equipment to determine a modulation and coding scheme.

The eNB acquires traffic volume information required by the UE and a CQI reported by the UE; after acquiring the CQI of the UE, the eNB converts the CQI of the UE into a corresponding SINR, and then determines a value of an MCS index and values of a modulation order and a transport block size index according to a table of MCSes and SINRs.

Step A4: The base station sends the modulation and coding scheme index to the user equipment.

Through the foregoing description of this embodiment, in the method, a base station stores a first higher order modulation mapping table supporting the higher order modulation and a first lower order modulation mapping table supporting the lower order modulation; the base station receives capability level information sent by user equipment; the base station determines, according to the capability level information sent by the user equipment, a first modulation mapping table used to communicate with the user equipment; the base station determines a modulation and coding scheme index according to the modulation mapping table, where the modulation and coding scheme index is used by the user equipment to determine a modulation and coding scheme; and the modulation and coding scheme index is sent to the user equipment. Therefore, both UE supporting 256QAM and UE not supporting 256QAM can accurately determine a modulation and coding scheme index, so as to perform data transmission. Therefore, in the method provided in this embodiment, an eNB can compatibly provide a service to UE supporting 256QAM modulation and UE not supporting 256QAM modulation, thereby overcoming a problem of incompatibility of an eNB in the prior art.

Optionally, when the user equipment stores the second higher order modulation mapping table supporting the higher order modulation and the second lower order modulation mapping table supporting the lower order modulation, the method further includes:

Step A5: The base station receives channel quality information reported by the user equipment, where the channel quality information includes a channel quality indicator (CQI).

Step A6: The base station determines, according to the channel quality information, whether to update the first modulation mapping table.

An implementation solution of determining, by the base station, according to the channel quality information, whether to update the first modulation mapping table in step A6 may be:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than (or equal to) a channel quality threshold, determining, by the base station, to update the first modulation mapping table, where an updated first modulation mapping table is the first higher order modulation mapping table.

Optionally, the method further includes:

Step A7: The base station sends first update information to the user equipment, where the first update information is used to instruct the user equipment to update a second modulation mapping table, and the second modulation mapping table is used to communicate with the base station, and is the second higher order modulation mapping table or the second lower order modulation mapping table.

Optionally, when the user equipment stores the second higher order modulation mapping table supporting the higher order modulation and the second lower order modulation mapping table supporting the lower order modulation, the method further includes:

Step A8: The base station receives second update information sent by the user equipment, where the second update information is used to instruct the base station to update the first modulation mapping table.

The first update information or the second update information is carried by a radio resource control message.

Alternatively, the first update information is transmitted by using a physical layer downlink control channel.

Embodiment 2

Figure 3:
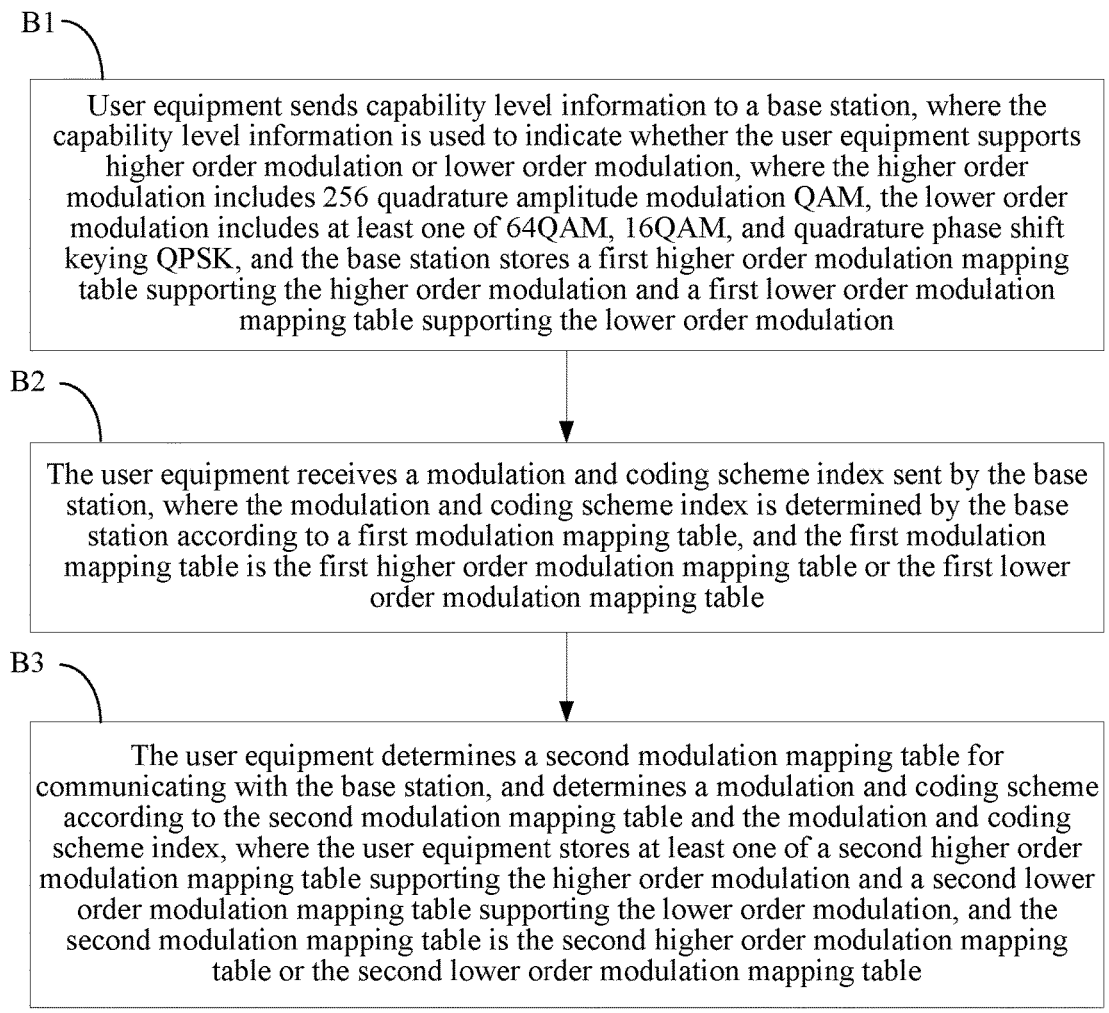
FIG. 3 is a simple schematic flowchart of a transmission method compatible with higher order modulation and lower order modulation according to Embodiment 2 of the present disclosure.

This embodiment of the present disclosure provides a transmission method used by user equipment. As shown in FIG. 3, the method includes:

Step B1: The user equipment sends capability level information to a base station, where the capability level information is used to indicate that the user equipment supports higher order modulation or lower order modulation, where the higher order modulation includes 256 quadrature amplitude modulation QAM, the lower order modulation includes at least one of 64QAM, 16QAM, and quadrature phase shift keying QPSK, and the base station stores a first higher order modulation mapping table supporting the higher order modulation and a first lower order modulation mapping table supporting the lower order modulation.

Step B2: The user equipment receives a modulation and coding scheme index sent by the base station, where the modulation and coding scheme index is determined by the base station according to a first modulation mapping table, and the first modulation mapping table is the first higher order modulation mapping table or the first lower order modulation mapping table.

Step B3: The user equipment determines a second modulation mapping table for communicating with the base station, and determines a modulation and coding scheme according to the second modulation mapping table and the modulation and coding scheme index.

The user equipment stores at least one of a second higher order modulation mapping table supporting the higher order modulation and a second lower order modulation mapping table supporting the lower order modulation, and the second modulation mapping table is the second higher order modulation mapping table or the second lower order modulation mapping table.

It should be noted that, the second higher order modulation mapping table may refer to a mapping table supporting 256QAM that is stored in the UE and described in subsequent embodiments; and the second lower order modulation mapping table may refer to a mapping table not supporting 256QAM that is stored in the UE and described in subsequent embodiments.

Through the foregoing description of this embodiment, in the method, the user equipment sends capability level information to a base station, and receives a modulation and coding scheme index sent by the base station; and the user equipment determines a second modulation mapping table for communicating with the base station, and determines a modulation and coding scheme according to the second modulation mapping table and the modulation and coding scheme index, where the user equipment stores at least one of a second higher order modulation mapping table supporting the higher order modulation and a second lower order modulation mapping table supporting the lower order modulation, so that an eNB can compatibly provide a service for UE supporting 256QAM modulation and UE not supporting 256QAM modulation, thereby overcoming a problem of incompatibility of an eNB in the prior art.

Optionally, when the user equipment stores the second higher order modulation mapping table supporting the higher order modulation, the determining, by the user equipment, a second modulation mapping table for communicating with the base station includes:

using, by the user equipment by default, the second higher order modulation mapping table as the second modulation mapping table.

Optionally, when the user equipment stores the second higher order modulation mapping table supporting the higher order modulation and the second lower order modulation mapping table supporting the lower order modulation, the determining, by the user equipment, a second modulation mapping table for communicating with the base station includes:

when a signal to interference plus noise ratio (SINR) is greater than (or equal to) an SINR threshold, determining, by the user equipment, that the second modulation mapping table is the second higher order modulation mapping table; or when a signal to interference plus noise ratio (SINR) is less than an SINR threshold, determining, by the user equipment, that the second modulation mapping table is the second lower order modulation mapping table.

Optionally, when the user equipment stores the second higher order modulation mapping table supporting the higher order modulation and the second lower order modulation mapping table supporting the lower order modulation, the method further includes:

Step B4: The user equipment sends channel quality information to the base station, where the channel quality information is used by the base station to determine whether to update the first modulation mapping table, and the channel quality information includes a channel quality indicator (CQI).

Optionally, the method further includes:

Step B5: The user equipment receives first update information sent by the base station, and updates the second modulation mapping table according to the first update information.

Optionally, when the user equipment stores the second higher order modulation mapping table supporting the higher order modulation and the second lower order modulation mapping table supporting the lower order modulation, the method further includes:

Step B6: The user equipment determines channel quality information, where the channel quality information includes a channel quality indicator.

The user equipment determines, according to the channel quality information, whether to update the second modulation mapping table.

Optionally, the determining, by the user equipment, according to the channel quality information, whether to update the second modulation mapping table specifically includes:

when the second modulation mapping table is the second higher order modulation mapping table, and the channel quality information is less than a channel quality threshold, determining, by the base station, to update the second modulation mapping table, where an updated second modulation mapping table is the second lower order modulation mapping table; or when the second modulation mapping table is the second lower order modulation mapping table, and the channel quality information is greater than (or equal to) a channel quality threshold, determining, by the base station, to update the second modulation mapping table, where an updated second modulation mapping table is the second higher order modulation mapping table.

Optionally, the method further includes:

Step B7: The user equipment sends second update information to the base station, where the second update information is used to instruct the base station to update the first modulation mapping table.

The first update information or the second update information is carried by a radio resource control message.

Alternatively, the first update information is transmitted by using a physical layer downlink control channel.

Embodiment 3

Figure 4:
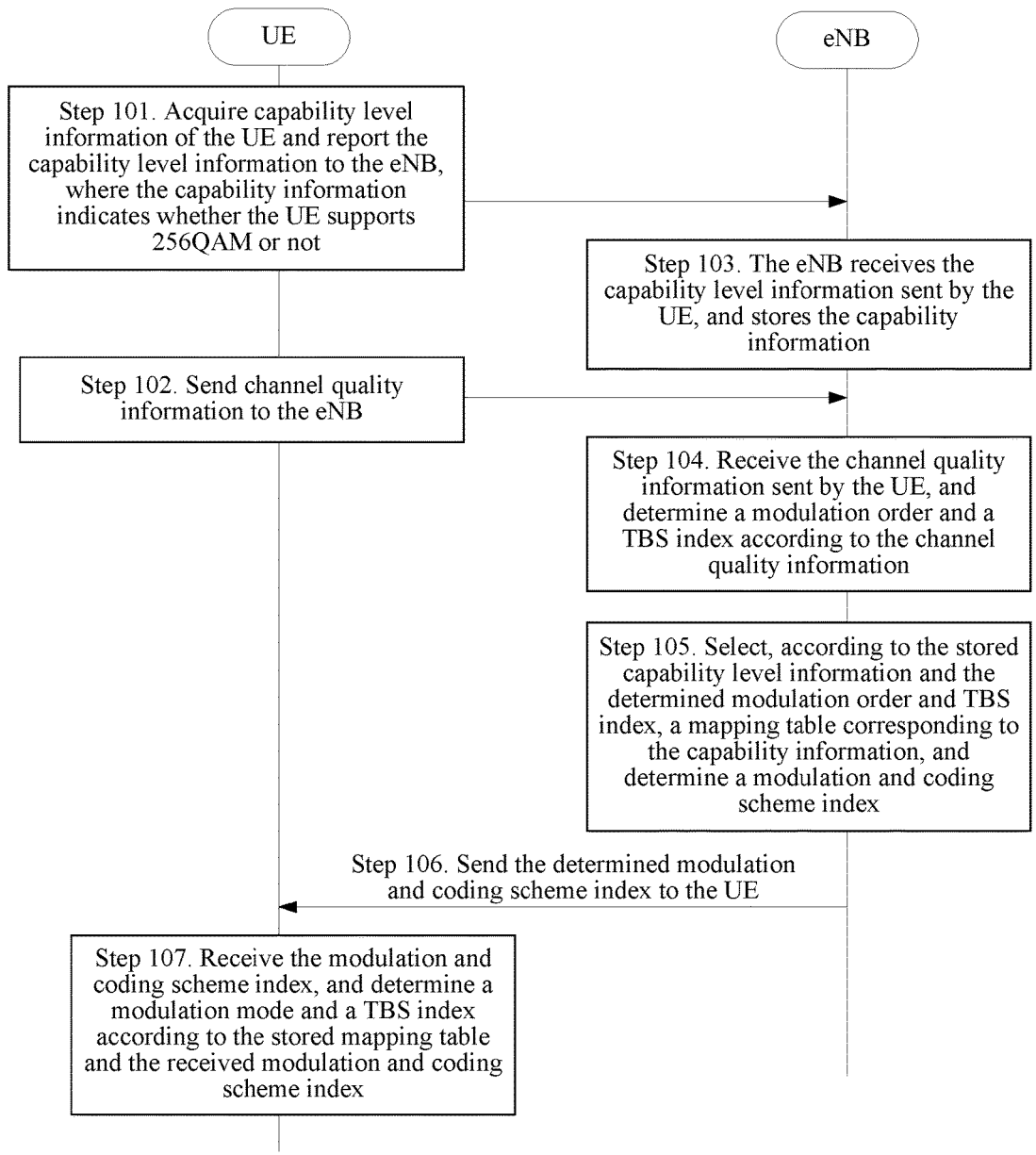
FIG. 4 is a simple schematic flowchart of a transmission method compatible with higher order modulation and lower order modulation according to Embodiment 3 of the present disclosure.

This embodiment of the present disclosure provides a transmission method compatible with higher order modulation and lower order modulation, where the method is based on Embodiment 1 and Embodiment 2, and is a solution reflecting interaction between multiple devices. As shown in FIG. 4, the method includes:

Step 101: UE sends capability level information to an eNB, where the capability level information indicates whether the UE supports 256QAM or not.

The UE may send the capability level information in a network connecting phase of the UE, but this embodiment does not limit that a moment of sending the capability level information is the network connecting phase of the UE, and the capability level information may be sent in another process.

Step 102: The UE sends channel quality information to the eNB, where the channel quality information may be specifically a channel quality indicator (CQI).

Step 103: The eNB receives the capability level information sent by the UE, and stores the capability level information.

Step 104: The eNB receives the channel quality information sent by the UE, and determines a modulation order and a TBS index according to the channel quality information.

A specific operation of determining a modulation order and a TBS index according to the channel quality information may be: acquiring, by the eNB, traffic volume information required by the UE, a CQI reported by the UE, and a current resource condition of the eNB, and after performing a comprehensive analysis, determining the modulation order and the TBS index.

Step 105: The eNB selects, according to the stored capability level information and the determined modulation order and TBS index, a mapping table corresponding to the capability level information, and determines a modulation and coding scheme index (IMCS), where the modulation and coding scheme index is used by the user equipment to determine a modulation and coding scheme. The selected mapping table corresponding to the capability level information may be understood as the "first modulation mapping table" in Embodiment 1.

If the capability level information sent by the UE indicates that the UE does not support 256QAM, the mapping table corresponding to the capability level information that is selected by the eNB is a mapping table not supporting 256QAM (or referred to as a common mapping table), as the mapping table shown in FIG. 1, which is the same as a mapping table in the prior art.

If the capability level information sent by the UE indicates that the UE supports 256QAM, the mapping table corresponding to the capability level information that is selected by the eNB is a mapping table supporting 256QAM (or referred to as a higher order mapping table), as the mapping table shown in FIG. 5. Modulation order numbers (Modulation Order) M0, M1, . . . , and M31 in the higher order mapping table in FIG. 5 are another representation manner of modulation orders represented by $2^{M_i}$. The table may be understood as that: it is assumed that a modulation order determined by a base station side is QPSK (that is, a number is 2, that is, M0 is 2), and a determined TBS index is 0 (that is, T0 is 0), and then, an MCS index determined by the eNB is 0 according to the mapping table shown in FIG. 5; or the MCS index determined by the eNB is still 0, but the corresponding modulation order number and the TBS index in the mapping table are different, that is, M0 is 8 (that is, 256QAM), and T0 is 1. It may be understood as that when the MCS index is 0, (M0, T0) may have one or more values; similarly, when the MCS index is i, (Mi, Ti) may have one or more values, that is, the eNB determines a value of the MCS index according to an acquired specific value of (Mi, Ti) and according to the mapping table shown in FIG. 5, where a value of i is (0, 31).

Further, it may be further understood that, the mapping table shown in FIG. 5 is only an example for ease of understanding, and is not intended to limit this embodiment of the present disclosure.

Step 106: The eNB sends the determined modulation and coding scheme index to the UE.

Step 107: The UE receives the modulation and coding scheme index, determines a modulation order and a TBS index according to the stored mapping table and the received modulation and coding scheme index, and determines a modulation and coding scheme.

It should be understood that, if the UE does not support 256QAM, the modulation and coding scheme index sent to the UE by the eNB is obtained according to the mapping table not supporting 256QAM that is stored in the eNB. Similarly, the UE receives the modulation and coding scheme index, and compares the modulation and coding scheme index with the mapping table not supporting 256QAM that is stored in the UE, to determine a modulation order and a TBS index, so as to perform data transmission.

If the UE supports 256QAM, the modulation and coding scheme index sent to the UE by the eNB is obtained according to the mapping table supporting 256QAM that is stored in the eNB. Similarly, the UE receives the modulation and coding scheme index, and compares the modulation and coding scheme index with the mapping table supporting 256QAM that is stored in the UE, to determine a modulation order and a TBS index, so as to perform data transmission.

Further, if the UE supporting 256QAM receives the modulation and coding scheme index sent by the eNB, a mapping table stored in the UE supporting 256QAM may be the same as the mapping table shown in FIG. 5. A simplest implementation manner may be that: in the mapping table shown in FIG. 5, when the MCS index is i, (Mi, Ti) has only one value; therefore, when receiving the modulation and coding scheme index sent by the eNB, the UE supporting 256QAM may determine the value of (Mi, Ti).

When the mapping table stored in the UE supporting 256QAM is shown in FIG. 5, and the MCS index is i, (Mi, Ti) has more than one value, the UE supporting 256QAM may further determine, according to channel quality information (such as a CQI) measured by the UE, a specific value of (Mi, Ti) when the MCS index is i. The principle thereof is that: if the channel quality information is relatively good, the specific value may correspond to a higher order modulation order, that is, Mi has two specific values: 2 and 4, which correspond to QPSK and 16QAM respectively, and if current channel quality of the UE is good, the specific value of Mi selected by the UE is 4 (that is, the selected modulation and coding scheme is 16QAM), and the UE acquires a value of Ti by using a same method.

Through the foregoing description of this embodiment, in the method, UE first reports capability level information, where the capability level information indicates whether the UE supports 256QAM or not, and the UE further reports channel quality information, used by an eNB to determine a modulation order and a TBS index according to the channel quality information; and the eNB selects, according to the capability level information and the determined modulation order and TBS index, a mapping table corresponding to the capability level information, and determines a modulation and coding scheme index. The modulation and coding scheme index that is sent by the eNB and received on a UE side is a modulation and coding scheme index that is finally determined by the eNB according to a capability of the UE; therefore, both UE supporting 256QAM and UE not supporting 256QAM can accurately determine a modulation order and a TBS index, so as to perform data transmission. Therefore, in the method provided in this embodiment, an eNB can compatibly provide a service to UE supporting 256QAM modulation and UE not supporting 256QAM modulation, thereby overcoming a problem of incompatibility of an eNB in the prior art.

Embodiment 4

This embodiment of the present disclosure provides a transmission method compatible with higher order modulation and lower order modulation. The method is similar to the method described in the foregoing Embodiment 3, and a difference lies in that UE supporting 256QAM described in this embodiment not only stores a mapping table supporting 256QAM, but also stores a mapping table not supporting 256QAM. In a case in which channel quality is relatively poor or a network side performs control, the UE supporting 256QAM may also select the mapping table not supporting 256QAM as a basis for data transmission. An advantage of the method is that a total quantity of modulation and coding scheme indexes (IMCS) in the mapping table supporting 256QAM that is stored in the UE supporting 256QAM is the same as a total quantity of modulation and coding scheme indexes (IMCS) in the mapping table not supporting 256QAM, as shown in FIG. 1 and FIG. 5, that is, two mapping tables have a same total quantity of modulation and coding schemes, and the total quantity is 32 by using FIG. 1 and FIG. 5 as an example. Because some modulation schemes lower than 256QAM are deleted from the mapping table supporting 256QAM, the mapping table supporting 256QAM and the existing mapping table not supporting 256QAM may be specific to different channel quality, and for a same modulation scheme, there are different transport block size TBS policies.

For example, as shown in FIG. 1, in the prior art, modulation schemes of 0 to 9 use QPSK, and there are 10 QPSK schemes in total. Different QPSK schemes correspond to different transport block sizes TBS. Because in the mapping table supporting 256QAM, some existing modulation and coding schemes such as QPSK are deleted, 256QAM is added. Therefore, scheduling extent increases in the prior art, and precise scheduling cannot be implemented.

Figure 6:
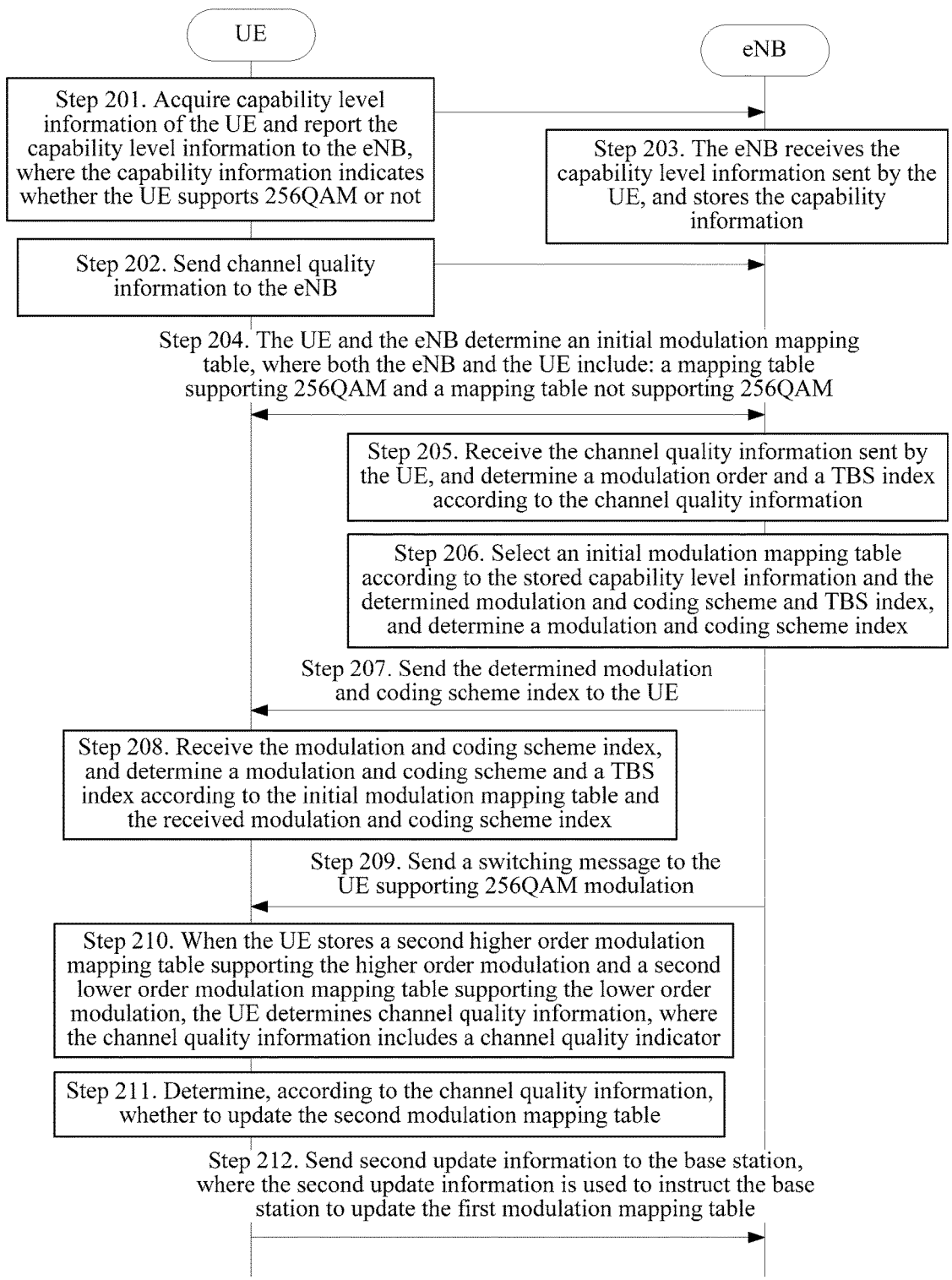
FIG. 6 is a simple schematic flowchart of a transmission method compatible with higher order modulation and lower order modulation according to Embodiment 4 of the present disclosure.

However, Embodiment 4 of the present disclosure is to resolve a problem that the UE supporting 256QAM performs excessive scheduling, and precise scheduling cannot be implemented. The foregoing problem is resolved by also storing the existing mapping table not supporting 256QAM in the UE. Specific solutions are as follows:

As shown in FIG. 6, the method includes:

Step 201: UE sends capability level information to an eNB, where the capability level information indicates whether the UE supports 256QAM or not.

The UE may send the capability level information in a network connecting phase of the UE, but this embodiment does not limit that a moment of sending the capability level information is the network connecting phase of the UE, and the capability level information may be sent in another process.

Step 202: The UE sends channel quality information to the eNB, where the channel quality information may be specifically a channel quality indicator (CQI).

Step 203: The eNB receives the capability level information sent by the UE, and stores the capability level information.

Step 204: The UE and the eNB determine an initial modulation mapping table, where both the eNB and the UE include: a mapping table supporting 256QAM and a mapping table not supporting 256QAM, and the initial modulation mapping table is the mapping table supporting 256QAM or the mapping table not supporting 256QAM.

The determining an initial modulation mapping table in step 204 may be specifically using, by default, a mapping table not supporting 256QAM, or using, by default, a mapping table supporting 256QAM; or may be determining, by the UE and the eNB through negotiation, that a mapping table supporting 256QAM or a mapping table not supporting 256QAM is the initial modulation mapping table.

Step 205: The eNB receives the channel quality information sent by the UE, and determines a modulation order and a TBS index according to the channel quality information.

Step 206: The eNB selects an initial modulation mapping table according to the stored capability level information and the determined modulation and coding scheme and TBS index, and determines a modulation and coding scheme index (IMCS).

Step 207: The eNB sends the determined modulation and coding scheme index to the UE.

Step 208: The UE receives the modulation and coding scheme index, and determines a modulation order and a TBS index according to the initial modulation mapping table and the received modulation and coding scheme index, so as to perform data transmission.

Through the foregoing description of the method provided in this embodiment of the present disclosure, in the method, UE first reports capability level information, where the capability level information indicates whether the UE supports 256QAM or not, and the UE further reports channel quality information, used by an eNB to determine a modulation order and a TBS index according to the channel quality information; and the eNB selects, according to the capability level information and the determined modulation order and TBS index, a mapping table corresponding to the capability level information, and determines a modulation and coding scheme index. The modulation and coding scheme index that is sent by the eNB and received on a UE side is a modulation and coding scheme index that is finally determined by the eNB according to a capability of the UE; therefore, both UE supporting 256QAM and UE not supporting 256QAM can accurately determine a modulation order and a TBS index, so as to perform data transmission. Therefore, in the method provided in this embodiment, an eNB can compatibly provide a service to UE supporting 256QAM modulation and UE not supporting 256QAM modulation, thereby overcoming a problem of incompatibility of an eNB in the prior art.

Further, in the method, the UE supporting 256QAM also stores a mapping table not supporting 256QAM, so that the UE not only can implement data transmission in higher order modulation, but also can implement precise scheduling.

Optionally, in an actual application, the eNB may control, according to a channel quality state, or a use condition of a radio resource, or other factors, to switch the initially determined modulation mapping table. Therefore, the method may further include:

Step 209: The eNB sends a switching message to the UE supporting 256QAM modulation, where the switching message may be understood as the "first update information" described in Embodiment 1.

A specific implementation of sending, by the eNB, a switching message to the UE supporting 256QAM modulation in step 209 may be: sending, by the eNB, a radio resource control (RRC) message, where the RRC message carries an instruction for switching a mapping table, and a specific operation may be: adding a field to the RRC message to support switching between two mapping tables. The described two mapping tables refer to: a mapping table supporting 256QAM and a mapping table not supporting 256QAM. An advantage of performing switching by using an RRC method is that an existing protocol is least affected.

Alternatively, a specific implementation of sending, by the eNB, a switching message to the UE supporting 256QAM modulation in step 209 may be: sending, by the eNB, downlink control information (DCI) by using a physical downlink control channel (PDCCH), where 1 bit may be added to the DCI to instruct the UE to use one of the two mapping tables. For example, for a DCI format 1 and a DCI format 1A, 1 bit may be added to a TPC command for PUCCH field; or for a DCI format 2, 1 bit may be added to a redundancy version field, where TPC is short for transmit power control, and PUCCH is short for physical uplink control channel. An advantage of performing switching by using a PDCCH method lies in real-time performance: real-time switching is supported.

It should be further understood that, the two tables on an eNB side or a UE side may be a large table, where the first half part of the large table is a mapping table not supporting 256QAM, and the second half part of the large table is a mapping table supporting 256QAM. PDCCH payload control manner is used to instruct the UE supporting 256QAM to use a mapping part supporting 256QAM or a mapping part not supporting 256QAM in the large table.

Optionally, in an actual application, when the UE stores a second higher order modulation mapping table supporting the higher order modulation and a second lower order modulation mapping table supporting the lower order modulation, the method further includes:

Step 210: The UE determines channel quality information, where the channel quality information includes a channel quality indicator.

Step 211: The UE determines, according to the channel quality information, whether to update the second modulation mapping table.

The determining, by the UE, according to the channel quality information, whether to update the second modulation mapping table in step 211 specifically includes:

when the second modulation mapping table is the second higher order modulation mapping table, and the channel quality information is less than a channel quality threshold, determining, by the UE, to update the second modulation mapping table, where an updated second modulation mapping table is the second lower order modulation mapping table; or when the second modulation mapping table is the second lower order modulation mapping table, and the channel quality information is greater than (or equal to) a channel quality threshold, determining, by the UE, to update the second modulation mapping table, where an updated second modulation mapping table is the second higher order modulation mapping table.

Step 212: The UE sends second update information to the base station, where the second update information is used to instruct the base station to update the first modulation mapping table.

The second update information is carried by a radio resource control message. For example, the UE may request, by using an RRC reconfiguration request message, the base station to update the first modulation mapping table for the user; and the base station determines a final modulation mapping table, and notifies the UE by using an RRC reconfiguration complete message, to implement consistency of modulation mapping tables of the base station and the UE.

The operation of controlling the UE to switch, by using a radio resource control RRC message or a physical downlink control channel PDCCH, a mapping table that is described above is not exhaustive, but is an example for ease of understanding. Another specific switching operation is not limited in this embodiment of the present disclosure.

Embodiment 5

This embodiment of the present disclosure provides a transmission method compatible with higher order modulation and lower order modulation, and the method is similar to that in Embodiment 4, that is, UE supporting 256QAM includes a mapping table supporting 256QAM (or referred to as implicit mapping information, where the implicit mapping information may be the mapping table supporting 256QAM), and the UE supporting 256QAM also includes a mapping table not supporting 256QAM (or referred to as explicit mapping information, where the explicit mapping information may be the mapping table not supporting 256QAM).

Figure 7:
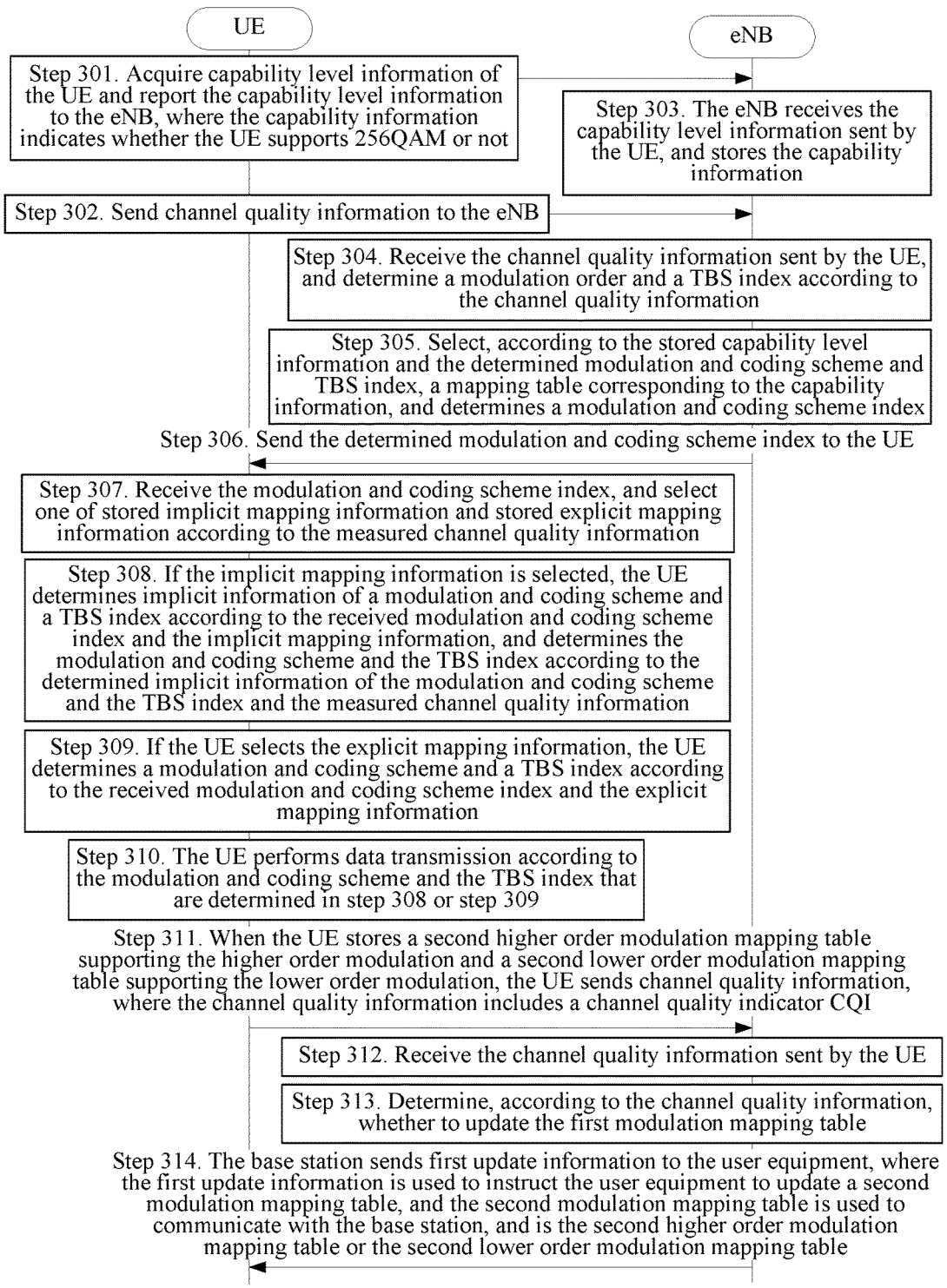
FIG. 7 is a simple schematic flowchart of a transmission method compatible with higher order modulation and lower order modulation according to Embodiment 5 of the present disclosure.

A difference between Embodiment 5 and Embodiment 4 lies in that, in this embodiment, the UE specifically determines implicit information by using channel quality information, such as a CQI, obtained by the UE through measurement. A specific description is as follows:

As shown in FIG. 7, the method includes:

Step 301: UE sends capability level information to an eNB, where the capability level information indicates whether the UE supports 256QAM or not.

The UE may send the capability level information in a network connecting phase of the UE, but this embodiment does not limit that a moment of sending the capability level information is the network connecting phase of the UE, and the capability level information may be sent in another process.

Step 302: The UE sends channel quality information to the eNB, where the channel quality information may be specifically a channel quality indicator (CQI).

Step 303: The eNB receives the capability level information sent by the UE, and stores the capability level information.

Step 304: The eNB receives channel quality information sent by the UE, and determines a modulation order and a TBS index according to the channel quality information.

A specific operation of determining a modulation order and a TBS index according to the channel quality information may be: acquiring, by the eNB, traffic volume information required by the UE, a CQI reported by the UE, and a current resource condition of the eNB, and after performing a comprehensive analysis, determining the modulation order and the TBS index.

Step 305: The eNB selects, according to the stored capability level information and the determined modulation order and TBS index, a mapping table corresponding to the capability level information, and determines a modulation and coding scheme index (IMCS).

If the capability level information sent by the UE indicates that the UE does not support 256QAM, the mapping table corresponding to the capability level information that is selected by the eNB is a mapping table not supporting 256QAM (which may also be collectively referred to as explicit mapping information), as the mapping table shown in FIG. 1, which is the same as a mapping table in the prior art.

If the capability level information sent by the UE indicates that the UE supports 256QAM, the mapping table corresponding to the capability level information that is selected by the eNB is a mapping table supporting 256QAM (which may also be collectively referred to as implicit mapping information), as the mapping table shown in FIG. 5. Modulation order numbers (Modulation Order) M0, M1, . . . , and M31 in the higher order mapping table in FIG. 5 separately represent modulation orders. The table may be understood as that: it is assumed that a modulation order determined by a base station side is QPSK (that is, a number is 2, that is, M0 is 2), and a determined TBS index is 0 (that is, T0 is 0), and then, an MCS index determined by the eNB is 0 according to the mapping table shown in FIG. 5; or the MCS index determined by the eNB is still 0, but the corresponding modulation order number and the TBS index in the mapping table are different, that is, M0 is 8 (that is, 256QAM), and T0 is 1. It may be understood as that when the MCS index is 0, (M0, T0) may have one or more values; similarly, when the MCS index is i, (Mi, Ti) may also have one or more values, that is, the eNB determines a value of the MCS index according to an acquired specific value of (Mi, Ti) and according to the mapping table shown in FIG. 5, where a value of i is (0, 31).

The implicit mapping information described above may be understood as that the specific value of (Mi, Ti) is not obtained explicitly, instead, the UE needs to accurately determine (Mi, Ti) according to a channel quality condition or another determining condition; therefore, in this process, (Mi, Ti) may be understood as implicit mapping information.

Step 306: Send the determined modulation and coding scheme index to the UE.

Step 307: The UE receives the modulation and coding scheme index, and the UE selects one of the stored implicit mapping information and the stored explicit mapping information according to the measured channel quality information (or it may be understood that, the UE stores a second higher order modulation mapping table supporting the higher order modulation and a second lower order modulation mapping table supporting the lower order modulation, where the second higher order modulation mapping table is stored as implicit mapping information, and the second lower order modulation mapping table is stored as explicit mapping information).

The UE may select one of the implicit mapping information and the explicit mapping information according to the measured channel quality information in step 307, and specifically, the UE may perform the selection according to a CQI, a signal to noise ratio, or another one or a combination of parameters that can reflect channel quality (which may be collectively referred to as channel quality information).

When the channel quality information reflects that the channel quality is higher than a threshold value indicating good quality, for example, when a CQI is greater than (or equal to) a threshold value indicating good channel quality, or a signal to noise ratio is greater than a threshold indicating good channel quality, the UE uses implicit mapping information, where the implicit mapping information may be specifically an implicit mapping table, or implicit mapping information included in a large table.

When the channel quality information reflects that the channel quality is lower than a threshold value indicating good quality, for example, when a CQI is less than a threshold value indicating good channel quality, or a signal to noise ratio is less than a threshold indicating good channel quality, the UE uses explicit mapping information, where the explicit mapping information may be specifically an explicit mapping table, or explicit mapping information included in a large table, and the explicit mapping information may be specifically shown in FIG. 1.

Step 308: If the implicit mapping information is selected, the UE determines implicit information of a modulation order and a TBS index according to the received modulation and coding scheme index and the implicit mapping information, and determines the modulation order and the TBS index according to the determined implicit information of the modulation order and the TBS index and the measured channel quality information.

For an understanding corresponding to the operation of the foregoing step 308, reference may be made to an example. For example, when the implicit mapping information is selected, the implicit mapping information may use what is shown in FIG. 5 as an example, and the determining, by the UE, implicit information of a modulation order and a TBS index according to the received modulation and coding scheme index and the implicit mapping information may specifically include: if the modulation and coding scheme index (IMCS) received by the UE is 1, according to the implicit mapping information shown in FIG. 5, the determined implicit information of the modulation order and the TBS index being (M1, T1).

The determining, by the UE, the modulation order and the TBS index according to the determined implicit information of the modulation order and the TBS index and the measured channel quality information may specifically include: according to the determined implicit information of the modulation order and the TBS index being (M1, T1) and the channel quality information (such as a CQI) obtained by the UE through measurement, if explicit channel quality of the channel quality information is good, determining, by the UE, that the modulation order may be a higher order, and a large transport block size may be selected; otherwise, a low modulation order and a small transport block size are selected. For the implicit information of (M1, T1) shown in FIG. 5, correspondingly, there are two cases of values, that is, (2, 6) and (4, 9); if the measured channel quality is greater than (or equal to) a second threshold value, it indicates that the channel quality is good, and the value of (M1, T1) is (4, 9), that is, the selected modulation and coding manner is 16QAM, and the transport block size (TBS) index is 9. It should be understood that, FIG. 5 shows an example for ease of understanding of the implicit mapping information, which is not intended to limit this embodiment of the present disclosure. Particularly, it should be understood that the implicit information such as (Mi, Ti) may have one or more values, which is not limited to a value in 2 of the example in FIG. 5. More value divisions of the implicit information such as (Mi, Ti) indicate more detailed divisions of channel quality, and the corresponding UE may transmit data by using a modulation and coding scheme, which facilitates correct demodulation on a peer end.

Step 309: If the UE selects the explicit mapping information, the UE determines a modulation order and a TBS index according to the received modulation and coding scheme index and the explicit mapping information.

Step 310: The UE performs data transmission according to the modulation order and the TBS index that are determined in step 308 or step 309.

Through the foregoing description of this embodiment, in the method, UE first reports capability level information, where the capability level information indicates whether the UE supports 256QAM or not, and the UE further reports channel quality information, used by an eNB to determine a modulation order and a TBS index according to the channel quality information; and the eNB selects, according to the capability level information and the determined modulation order and TBS index, a mapping table corresponding to the capability level information, and determines a modulation and coding scheme index. The modulation and coding scheme index that is sent by the eNB and received on a UE side is a modulation and coding scheme index that is finally determined by the eNB according to a capability of the UE; therefore, both UE supporting 256QAM and UE not supporting 256QAM can accurately determine a modulation order and a TBS index, so as to perform data transmission. Therefore, in the method provided in this embodiment, an eNB can compatibly provide a service to UE supporting 256QAM modulation and UE not supporting 256QAM modulation, thereby overcoming a problem of incompatibility of an eNB in the prior art.

Further, in the method, the UE supporting 256QAM stores, in a form of explicit mapping information and implicit mapping information, mapping information supporting 256QAM and mapping information not support 256QAM respectively, so that the UE not only can implement data transmission in higher order modulation, but also can implement precise scheduling.

Further, when the UE stores the second higher order modulation mapping table supporting the higher order modulation and the second lower order modulation mapping table supporting the lower order modulation, the method further includes:

Step 311: The UE sends channel quality information, where the channel quality information includes a channel quality indicator (CQI).

Step 312: The base station receives the channel quality information reported by the user equipment, where the channel quality information includes the channel quality indicator (CQI).

Step 313: The base station determines, according to the channel quality information, whether to update the first modulation mapping table.

The determining, by the base station, according to the channel quality information, whether to update the first modulation mapping table in step 313 includes:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than (or equal to) a channel quality threshold, determining, by the base station, to update the first modulation mapping table, where an updated first modulation mapping table is the first higher order modulation mapping table.

Step 314: The base station sends first update information to the user equipment, where the first update information is used to instruct the user equipment to update a second modulation mapping table, and the second modulation mapping table is used to communicate with the base station, and is the second higher order modulation mapping table or the second lower order modulation mapping table.

The first update information may be carried by a radio resource control message, or the first update information is transmitted by using a physical layer downlink control channel.

Embodiment 6

Figure 8:
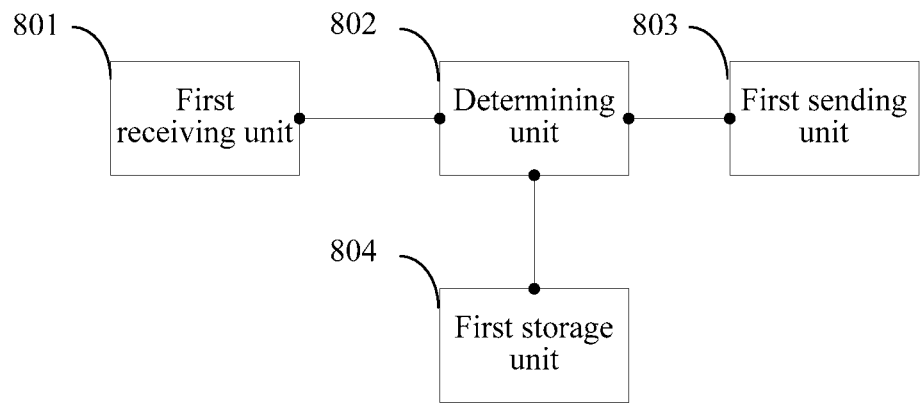
FIG. 8 is a simple schematic diagram of a base station according to Embodiment 6 of the present disclosure.

This embodiment of the present disclosure provides a base station, where in this embodiment, the higher order modulation includes 256 quadrature amplitude modulation QAM, and the lower order modulation includes at least one of 64QAM, 16QAM, and quadrature phase shift keying QPSK. As shown in FIG. 8, the base station includes:

a first receiving unit 801, a determining unit 802, and a first sending unit 803, and a first storage unit 804, where the first receiving unit 801 is configured to receive capability level information sent by user equipment, where the capability level information is used to indicate that the user equipment supports the higher order modulation or supports the lower order modulation;

the determining unit 802 is configured to determine, according to the capability level information sent by the user equipment, a first modulation mapping table used to communicate with the user equipment, where the first modulation mapping table is the first higher order modulation mapping table or the first lower order modulation mapping table;

the determining unit 802 is further configured to determine a modulation and coding scheme index according to the modulation mapping table, where the modulation and coding scheme index is used by the user equipment to determine a modulation and coding scheme;

the first sending unit 803 is configured to send the modulation and coding scheme index to the user equipment; and the first storage unit 804 is configured to store a first higher order modulation mapping table supporting the higher order modulation and a first lower order modulation mapping table supporting the lower order modulation.

Through the foregoing description of this embodiment, a base station stores a first higher order modulation mapping table supporting the higher order modulation and a first lower order modulation mapping table supporting the lower order modulation; the base station receives capability level information sent by user equipment; the base station determines, according to the capability level information sent by the user equipment, a first modulation mapping table used to communicate with the user equipment; the base station determines a modulation and coding scheme index according to the modulation mapping table, where the modulation and coding scheme index is used by the user equipment to determine a modulation and coding scheme; and the modulation and coding scheme index is sent to the user equipment. Therefore, both UE supporting 256QAM and UE not supporting 256QAM can accurately determine a modulation and coding scheme index, so as to perform data transmission. Therefore, an eNB can compatibly provide a service to UE supporting 256QAM modulation and UE not supporting 256QAM modulation, thereby overcoming a problem of incompatibility of an eNB in the prior art.

Optionally, the determining, by the determining unit, according to the capability level information sent by the user equipment, a first modulation mapping table used to communicate with the user equipment includes:

when the capability level information indicates that the user equipment supports the higher order modulation, determining, by the base station, that the modulation mapping table is the first higher order modulation mapping table, where the user equipment stores a second higher order modulation mapping table supporting the higher order modulation.

Optionally, the determining, by the determining unit, according to the capability level information sent by the user equipment, a first modulation mapping table used to communicate with the user equipment includes:

when the capability level information indicates that the user equipment supports the higher order modulation, and a signal to interference plus noise ratio (SINR) is greater than (or equal to) an SINR threshold, determining, by the base station, that the first modulation mapping table is the first higher order modulation mapping table; or when the capability level information indicates that the user equipment supports the higher order modulation, and a signal to interference plus noise ratio (SINR) is less than an SINR threshold, determining, by the base station, that the first modulation mapping table is the first lower order modulation mapping table, where the user equipment stores a second higher order modulation mapping table supporting the higher order modulation and a second lower order modulation mapping table supporting the lower order modulation.

Optionally, when the user equipment stores the second higher order modulation mapping table supporting the higher order modulation and the second lower order modulation mapping table supporting the lower order modulation, the first receiving unit is further configured to receive channel quality information reported by the user equipment, where the channel quality information includes a channel quality indicator (CQI); and the determining unit is further configured to determine, according to the channel quality information, whether to update the first modulation mapping table.

Optionally, the determining, by the determining unit, according to the channel quality information, whether to update the first modulation mapping table includes:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than (or equal to) a channel quality threshold, determining, by the base station, to update the first modulation mapping table, where an updated first modulation mapping table is the first higher order modulation mapping table.

Optionally, the first sending unit is further configured to send first update information to the user equipment, where the first update information is used to instruct the user equipment to update a second modulation mapping table, and the second modulation mapping table is used to communicate with the base station, and is the second higher order modulation mapping table or the second lower order modulation mapping table.

Optionally, when the user equipment stores the second higher order modulation mapping table supporting the higher order modulation and the second lower order modulation mapping table supporting the lower order modulation, the first receiving unit is further configured to receive second update information sent by the user equipment, where the second update information is used to instruct the base station to update the first modulation mapping table.

Optionally, the first update information or the second update information is carried by a radio resource control message.

Optionally, the first update information is transmitted by using a physical layer downlink control channel.

For a detailed description of the base station provided in this embodiment, reference may also be made to Embodiment 1, Embodiment 3, Embodiment 4, and Embodiment 5 of the method, which is not described herein again.

Embodiment 7

Figure 9:
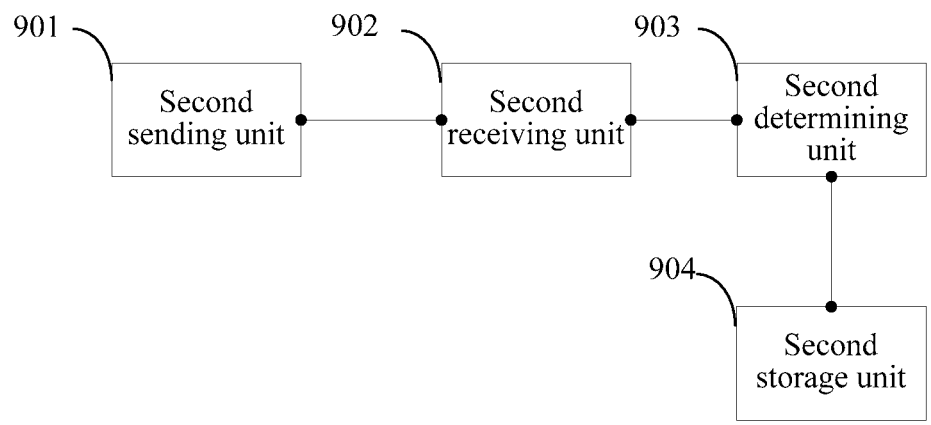
FIG. 9 is a simple schematic diagram of user equipment according to Embodiment 7 of the present disclosure.

This embodiment of the present disclosure provides user equipment. As shown in FIG. 9, the user equipment includes: a second sending unit 901, a second receiving unit 902, a second determining unit 903, and a second storage unit 904, where the second sending unit 901 is configured to send capability level information to a base station, where the capability level information is used to indicate that the user equipment supports higher order modulation or lower order modulation, where the higher order modulation includes 256 quadrature amplitude modulation QAM, the lower order modulation includes at least one of 64QAM, 16QAM, and quadrature phase shift keying QPSK, and the base station stores a first higher order modulation mapping table supporting the higher order modulation and a first lower order modulation mapping table supporting the lower order modulation;

the second receiving unit 902 is configured to receive a modulation and coding scheme index sent by the base station, where the modulation and coding scheme index is determined by the base station according to a first modulation mapping table, and the first modulation mapping table is the first higher order modulation mapping table or the first lower order modulation mapping table;

the second determining unit 903 is configured to determine a second modulation mapping table for communicating with the base station, and determine a modulation and coding scheme according to the second modulation mapping table and the modulation and coding scheme index; and the second storage unit 904 is configured to store at least one of a second higher order modulation mapping table supporting the higher order modulation and a second lower order modulation mapping table supporting the lower order modulation, where the second modulation mapping table is the second higher order modulation mapping table or the second lower order modulation mapping table.

Through the foregoing description of this embodiment, user equipment sends capability level information to a base station, and receives a modulation and coding scheme index sent by the base station; and the user equipment determines a second modulation mapping table for communicating with the base station, and determines a modulation and coding scheme according to the second modulation mapping table and the modulation and coding scheme index, where the user equipment stores at least one of a second higher order modulation mapping table supporting the higher order modulation and a second lower order modulation mapping table supporting the lower order modulation, so that an eNB can compatibly provide a service for UE supporting 256QAM modulation and UE not supporting 256QAM modulation, thereby overcoming a problem of incompatibility of an eNB in the prior art.

Optionally, when the user equipment stores the second higher order modulation mapping table supporting the higher order modulation, the determining, by the second determining unit, a second modulation mapping table for communicating with the base station includes:

using, by default, the second higher order modulation mapping table as the second modulation mapping table.

Optionally, when the user equipment stores the second higher order modulation mapping table supporting the higher order modulation and the second lower order modulation mapping table supporting the lower order modulation, the determining, by the second determining unit, a second modulation mapping table for communicating with the base station includes:

when a signal to interference plus noise ratio (SINR) is greater than (or equal to) an SINR threshold, determining, by the user equipment, that the second modulation mapping table is the second higher order modulation mapping table; or when a signal to interference plus noise ratio (SINR) is less than an SINR threshold, determining, by the user equipment, that the second modulation mapping table is the second lower order modulation mapping table.

Optionally, when the second storage unit stores the second higher order modulation mapping table supporting the higher order modulation and the second lower order modulation mapping table supporting the lower order modulation, the second sending unit is further configured to send channel quality information to the base station, where the channel quality information is used by the base station to determine whether to update the first modulation mapping table, and the channel quality information includes a channel quality indicator (CQI).

Optionally, the second receiving unit is further configured to receive first update information sent by the base station; and the user equipment further includes: an updating unit, configured to update the second modulation mapping table according to the first update information.

Optionally, when the second storage unit stores the second higher order modulation mapping table supporting the higher order modulation and the second lower order modulation mapping table supporting the lower order modulation, the second determining unit is further configured to determine channel quality information, where the channel quality information includes a channel quality indicator; and determine, according to the channel quality information, whether to update the second modulation mapping table.

Optionally, the determining, by the second determining unit, according to the channel quality information, whether to update the second modulation mapping table includes:

when the second modulation mapping table is the second higher order modulation mapping table, and the channel quality information is less than a channel quality threshold, determining, by the user equipment, to update the second modulation mapping table, where an updated second modulation mapping table is the second lower order modulation mapping table; or when the second modulation mapping table is the second lower order modulation mapping table, and the channel quality information is greater than (or equal to) a channel quality threshold, determining, by the user equipment, to update the second modulation mapping table, where an updated second modulation mapping table is the second higher order modulation mapping table.

Optionally, the second sending unit is further configured to send second update information to the base station, where the second update information is used to instruct the base station to update the first modulation mapping table.

Optionally, the first update information or the second update information is carried by a radio resource control message.

Optionally, the first update information is transmitted by using a physical layer downlink control channel.

For a detailed description of the user equipment provided in this embodiment, reference may also be made to Embodiment 2, Embodiment 3, Embodiment 4, and Embodiment 5 of the method, which is not described herein again.

Embodiment 8

Figure 10:
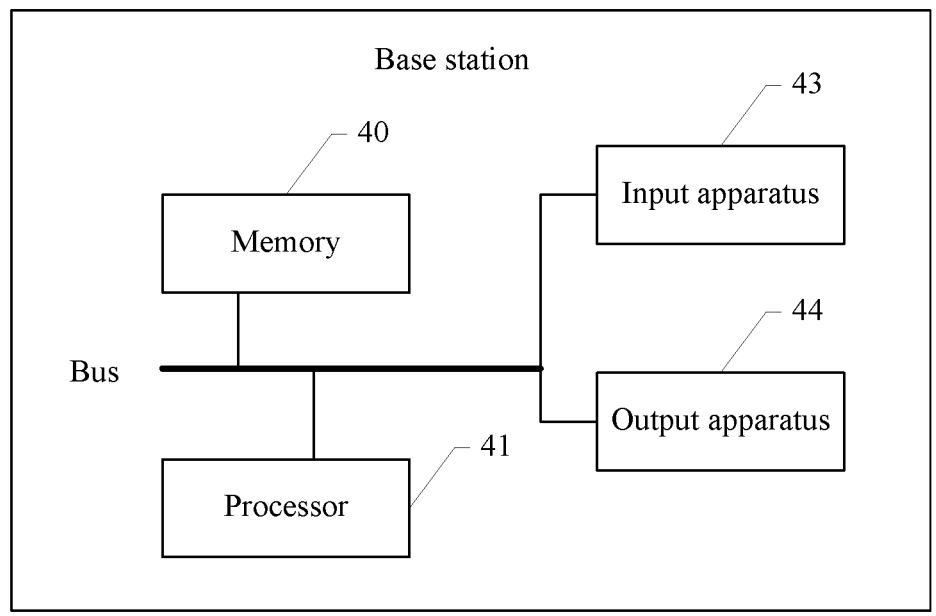
FIG. 10 is a simple schematic diagram of a base station according to Embodiment 8 of the present disclosure.

This embodiment of the present disclosure further provides a base station, and a schematic structural diagram is shown in FIG. 10. The base station includes a memory 40, a processor 41, an input apparatus 43, and an output apparatus 44 that are separately connected to a bus.

The memory 40 is configured to store data input from the input apparatus 43, and may further store information such as a necessary file for processing data by the processor 41.

It should be understood that, higher order modulation includes 256 quadrature amplitude modulation (QAM), and the lower order modulation includes at least one of 64QAM, 16QAM, and quadrature phase shift keying (QPSK).

The input apparatus 43 is configured to receive capability level information sent by user equipment, where the capability level information is used to indicate that the user equipment supports the higher order modulation or supports the lower order modulation.

The processor 41 is configured to determine, according to the capability level information sent by the user equipment, a first modulation mapping table used to communicate with the user equipment, where the first modulation mapping table is the first higher order modulation mapping table or the first lower order modulation mapping table; and determine a modulation and coding scheme index according to the modulation mapping table, where the modulation and coding scheme index is used by the user equipment to determine a modulation and coding scheme.

The output apparatus 44 is configured to send the modulation and coding scheme index to the user equipment.

The memory 40 is further configured to store, by the base station, a first higher order modulation mapping table supporting the higher order modulation and a first lower order modulation mapping table supporting the lower order modulation.

Through the foregoing description of this embodiment, a base station stores a first higher order modulation mapping table supporting the higher order modulation and a first lower order modulation mapping table supporting the lower order modulation; the base station receives capability level information sent by user equipment; the base station determines, according to the capability level information sent by the user equipment, a first modulation mapping table used to communicate with the user equipment; the base station determines a modulation and coding scheme index according to the modulation mapping table, where the modulation and coding scheme index is used by the user equipment to determine a modulation and coding scheme; and the modulation and coding scheme index is sent to the user equipment. Therefore, both UE supporting 256QAM and UE not supporting 256QAM can accurately determine a modulation and coding scheme index, so as to perform data transmission. Therefore, an eNB can compatibly provide a service to UE supporting 256QAM modulation and UE not supporting 256QAM modulation, thereby overcoming a problem of incompatibility of an eNB in the prior art.

Optionally, the determining, by the processor 41, according to capability level information sent by the user equipment, a first modulation mapping table used to communicate with the user equipment includes:

when the capability level information indicates that the user equipment supports the higher order modulation, determining, by the base station, that the modulation mapping table is the first higher order modulation mapping table, where the user equipment stores a second higher order modulation mapping table supporting the higher order modulation.

Optionally, the determining, by the processor 41, according to capability level information sent by the user equipment, a first modulation mapping table used to communicate with the user equipment includes:

when the capability level information indicates that the user equipment supports the higher order modulation, and a signal to interference plus noise ratio (SINR) is greater than an SINR threshold, determining, by the base station, that the first modulation mapping table is the first higher order modulation mapping table; or when the capability level information indicates that the user equipment supports the higher order modulation, and a signal to interference plus noise ratio (SINR) is less than an SINR threshold, determining, by the base station, that the first modulation mapping table is the first lower order modulation mapping table, where the user equipment stores a second higher order modulation mapping table supporting the higher order modulation and a second lower order modulation mapping table supporting the lower order modulation.

Optionally, when the user equipment stores the second higher order modulation mapping table supporting the higher order modulation and the second lower order modulation mapping table supporting the lower order modulation, the input apparatus 43 is further configured to receive channel quality information reported by the user equipment, where the channel quality information includes a channel quality indicator (CQI); and the processor 41 is further configured to determine, according to the channel quality information, whether to update the first modulation mapping table.

Optionally, the determining, by the processor 41, according to the channel quality information, whether to update the first modulation mapping table includes:

when the first modulation mapping table is the first higher order modulation mapping table, and the channel quality information is less than a channel quality threshold, determining, by the base station, to update the first modulation mapping table, where an updated first modulation mapping table is the first lower order modulation mapping table; or when the first modulation mapping table is the second lower order modulation mapping table, and the channel quality information is greater than a channel quality threshold, determining, by the base station, to update the first modulation mapping table, where an updated first modulation mapping table is the first higher order modulation mapping table.

Optionally, the output apparatus 44 is further configured to send first update information to the user equipment, where the first update information is used to instruct the user equipment to update a second modulation mapping table, and the second modulation mapping table is used to communicate with the base station, and is the second higher order modulation mapping table or the second lower order modulation mapping table.

Optionally, when the user equipment stores the second higher order modulation mapping table supporting the higher order modulation and the second lower order modulation mapping table supporting the lower order modulation, the output apparatus 44 is further configured to receive second update information sent by the user equipment, where the second update information is used to instruct the base station to update the first modulation mapping table.

Optionally, the first update information or the second update information is carried by a radio resource control message.

Optionally, the first update information is transmitted by using a physical layer downlink control channel.

Embodiment 9

Figure 11:
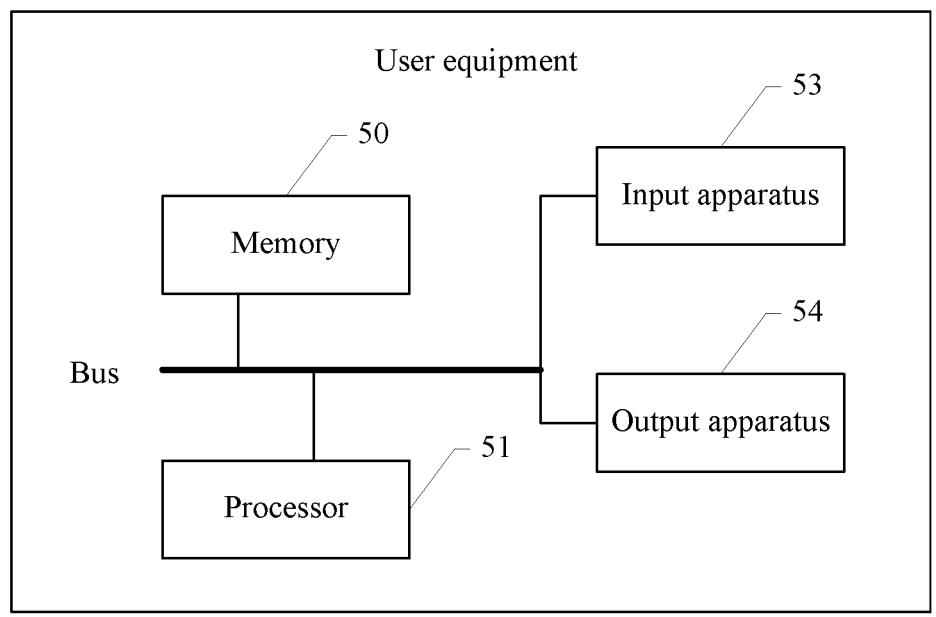
FIG. 11 is a simple schematic diagram of user equipment according to Embodiment 9 of the present disclosure.

This embodiment of the present disclosure further provides user equipment, and a schematic structural diagram is shown in FIG. 11. The user equipment includes a memory 50, a processor 51, an input apparatus 53, and an output apparatus 54 that are separately connected to a bus.

The memory 50 is configured to store data input from the input apparatus 53, and may further store information such as a necessary file for processing data by the processor 51.

The output apparatus 54 is configured to send capability level information to a base station, where the capability level information is used to indicate that the user equipment supports higher order modulation or lower order modulation, where the higher order modulation includes 256 quadrature amplitude modulation (QAM), the lower order modulation includes at least one of 64QAM, 16QAM, and quadrature phase shift keying (QPSK), and the base station stores a first higher order modulation mapping table supporting the higher order modulation and a first lower order modulation mapping table supporting the lower order modulation.

The input apparatus 53 is configured to receive a modulation and coding scheme index sent by the base station, where the modulation and coding scheme index is determined by the base station according to a first modulation mapping table, and the first modulation mapping table is the first higher order modulation mapping table or the first lower order modulation mapping table.

The processor 51 is configured to determine a second modulation mapping table for communicating with the base station, and determine a modulation and coding scheme according to the second modulation mapping table and the modulation and coding scheme index.

The memory 50 is configured to store at least one of a second higher order modulation mapping table supporting the higher order modulation and a second lower order modulation mapping table supporting the lower order modulation, and the second modulation mapping table is the second higher order modulation mapping table or the second lower order modulation mapping table.

Through the foregoing description of this embodiment, user equipment sends capability level information to a base station, and receives a modulation and coding scheme index sent by the base station; and the user equipment determines a second modulation mapping table for communicating with the base station, and determines a modulation and coding scheme according to the second modulation mapping table and the modulation and coding scheme index, where the user equipment stores at least one of a second higher order modulation mapping table supporting the higher order modulation and a second lower order modulation mapping table supporting the lower order modulation, so that an eNB can compatibly provide a service for UE supporting 256QAM modulation and UE not supporting 256QAM modulation, thereby overcoming a problem of incompatibility of an eNB in the prior art.

Optionally, when the memory 50 stores a second higher order modulation mapping table supporting the higher order modulation, the determining, by the processor 51, a second modulation mapping table for communicating with the base station includes:

using, by default, the second higher order modulation mapping table as the second modulation mapping table.

Optionally, when the memory 50 stores the second higher order modulation mapping table supporting the higher order modulation and the second lower order modulation mapping table supporting the lower order modulation, the determining, by the processor 51, a second modulation mapping table for communicating with the base station includes:

when a signal to interference plus noise ratio (SINR) is greater than an SINR threshold, determining, by the user equipment, that the second modulation mapping table is the second higher order modulation mapping table; or when a signal to interference plus noise ratio (SINR) is less than an SINR threshold, determining, by the user equipment, that the second modulation mapping table is the second lower order modulation mapping table.

Optionally, when the memory 50 stores the second higher order modulation mapping table supporting the higher order modulation and the second lower order modulation mapping table supporting the lower order modulation, the output apparatus 54 is further configured to send channel quality information to the base station, where the channel quality information is used by the base station to determine whether to update the first modulation mapping table, and the channel quality information includes a channel quality indicator (CQI).

Optionally, the input apparatus 53 is further configured to receive first update information sent by the base station; and the processor 51 is further configured to update the second modulation mapping table according to the first update information.

Optionally, when the memory 50 stores the second higher order modulation mapping table supporting the higher order modulation and the second lower order modulation mapping table supporting the lower order modulation, the processor 51 is further configured to determine channel quality information, where the channel quality information includes a channel quality indicator; and determine, according to the channel quality information, whether to update the second modulation mapping table.

Optionally, the determining, by the processor 51, according to the channel quality information, whether to update the second modulation mapping table includes:

when the second modulation mapping table is the second higher order modulation mapping table, and the channel quality information is less than a channel quality threshold, determining, by the user equipment, to update the second modulation mapping table, where an updated second modulation mapping table is the second lower order modulation mapping table; or when the second modulation mapping table is the second lower order modulation mapping table, and the channel quality information is greater than a channel quality threshold, determining, by the user equipment, to update the second modulation mapping table, where an updated second modulation mapping table is the second higher order modulation mapping table.

Optionally, the output apparatus 54 is further configured to send second update information to the base station, where the second update information is used to instruct the base station to update the first modulation mapping table.

Optionally, the first update information or the second update information is carried by a radio resource control message.

Optionally, the first update information is transmitted by using a physical layer downlink control channel.

It should be noted that, in the foregoing embodiments, the description of each embodiment has respective focuses. For a part that is not described in detail in an embodiment, reference may be made to related description in other embodiments. In addition, in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element limited by "includes a . . . " does not, without more constraints, preclude the existence of additional identical elements in the process, method, article, or device that includes the element.

A person of ordinary skill in the art may understand that all or some of the steps of the methods in the embodiments may be implemented by a program instructing relevant hardware. The program may be stored in a computer readable storage medium. The storage medium may include: a read-only memory, a magnetic disk, or an optical disc.

The foregoing describes in detail a transmission method compatible with higher order modulation and lower order modulation, and an apparatus provided in the present disclosure. A person of ordinary skill in the art may make alterations to specific implementation manners and application scopes based on the idea of the embodiments of the present disclosure. In conclusion, content of this specification shall not be understood as a limitation to the present disclosure.

What is claimed is:

1. A transmission method supporting higher order modulation and lower order modulation, the method comprising:
   receiving, by a base station, capability level information from a user equipment, wherein the capability level information is used to indicate that the user equipment supports higher order modulation or supports lower order modulation, wherein the higher order modulation comprises 256 quadrature amplitude modulation (QAM), the lower order modulation comprises at least one of 64QAM, 16QAM, and quadrature phase shift keying (QPSK);
   selecting, by the base station according to the capability level information, a modulation mapping table used to communicate with the user equipment from a higher order modulation mapping table and a lower order modulation mapping table, wherein the higher order modulation mapping table and the lower order modulation mapping table are stored in the base station, the higher order modulation mapping table supporting the higher order modulation, the lower order modulation mapping table supporting the lower order modulation;
   determining, by the base station, a modulation and coding scheme index according to the selected modulation mapping table, wherein the modulation and coding scheme index indicates a modulation and coding scheme;
   sending, by the base station, the modulation and coding scheme index to the user equipment;
   receiving, by the base station, channel quality information reported by the user equipment, wherein the channel quality information comprises a channel quality indicator (CQI); and
   determining, by the base station, according to the channel quality information, whether to update selection of the higher order modulation mapping table or the lower order modulation mapping table as the modulation mapping table used to communicate with the user equipment.

2. The method according to claim 1, wherein the selecting, by the base station according to the capability level information, the modulation mapping table used to communicate with the user equipment from the higher order modulation mapping table and the lower order modulation mapping table comprises:

selecting, by the base station, the higher order modulation mapping table to communicate with the user equipment in a case that the capability level information indicates that the user equipment supports the higher order modulation.

3. The method according to claim 1, wherein the selecting, by the base station according to the capability level information, the modulation mapping table used to communicate with the user equipment from the higher order modulation mapping table and the lower order modulation mapping table comprises:

selecting, by the base station, the higher order modulation mapping table to communicate with the user equipment in a case that in a case that the capability level information indicates that the user equipment supports the higher order modulation, and a signal to interference plus noise ratio (SINR) is greater than an SINR threshold.

4. The method according to claim 1, wherein the selecting, by the base station according to the capability level information, the modulation mapping table used to communicate with the user equipment from the higher order modulation mapping table and the lower order modulation mapping table comprises:

selecting, by the base station, the lower order modulation mapping table to communicate with the user equipment in a case that the capability level information indicates that the user equipment supports the higher order modulation, and a signal to interference plus noise ratio (SINR) is less than an SINR threshold.

5. The method according to claim 1, wherein the determining, by the base station, according to the channel quality information, whether to update the modulation mapping table used to communicate with the user equipment comprises:

when the modulation mapping table used to communicate with the user equipment is the higher order modulation mapping table, and the channel quality information is less than a channel quality threshold, determining, by the base station, to update the modulation mapping table, and an updated modulation mapping table is the lower order modulation mapping table.

6. The method according to claim 1, wherein the determining, by the base station, according to the channel quality information, whether to update the modulation mapping table used to communicate with the user equipment comprises:

when the modulation mapping table used to communicate with the user equipment is the lower order modulation mapping table, and the channel quality information is greater than a channel quality threshold, determining, by the base station, to update the modulation mapping table, and an updated modulation mapping table is the higher order modulation mapping table.

7. The method according to claim 5, further comprising:
sending, by the base station, first update information to the user equipment, wherein the first update information is used to instruct the user equipment to update a modulation mapping table used to communicate with the base station.

8. The method according to claim 7, wherein the first update information is carried by a radio resource control (RRC) message.

9. The method according to claim 1, further comprising:
receiving, by the base station, second update information from the user equipment, wherein the second update information is used to instruct the base station to update the modulation mapping table used to communicate with the user equipment.

10. A base station, comprising:
a receiver, configured to receive capability level information from a user equipment, wherein the capability level information is used to indicate that the user equipment supports higher order modulation or supports lower order modulation, wherein the higher order modulation comprises 256 quadrature amplitude modulation (QAM), the lower order modulation comprises at least one of 64QAM, 16QAM, and quadrature phase shift keying (QPSK);
a processor, configured to:
select, according to the capability level information, a modulation mapping table used to communicate with the user equipment from a higher order modulation mapping table and a lower order modulation mapping table, wherein the higher order modulation mapping table and the lower order modulation mapping table are stored in the base station, the higher order modulation mapping table supporting the higher order modulation, the lower order modulation mapping table supporting the lower order modulation, and
determine a modulation and coding scheme index according to the selected modulation mapping table, wherein the modulation and coding scheme index indicates a modulation and coding scheme; and
a transmitter, configured to send the modulation and coding scheme index to the user equipment;
wherein the receiver is further configured to receive channel quality information reported by the user equipment, wherein the channel quality information comprises a channel quality indicator (CQI); and
wherein the processor is further configured to determine, according to the channel quality information, whether to update selection of the higher order modulation mapping table or the lower order modulation mapping table as the modulation mapping table used to communicate with the user equipment.

11. The base station according to claim 10, wherein the processor is configured to select the higher order modulation mapping table to communicate with the user equipment in a case that the capability level information indicates that the user equipment supports the higher order modulation.

12. The base station according to claim 10, wherein the processor is configured to select the higher order modulation mapping table to communicate with the user equipment in a case that in a case that the capability level information indicates that the user equipment supports the higher order modulation, and a signal to interference plus noise ratio (SINR) is greater than an SINR threshold.

13. The base station according to claim 10, wherein the processor is configured to select the lower order modulation mapping table to communicate with the user equipment in a case that the capability level information indicates that the user equipment supports the higher order modulation, and a signal to interference plus noise ratio (SINR) is less than an SINR threshold.

14. The base station according to claim 10, wherein:
the processor is configured to determine to update the modulation mapping table used to communicate with the user equipment in a case that the modulation mapping table is the higher order modulation mapping table, and the channel quality information is less than a channel quality threshold, and an updated modulation mapping table is the lower order modulation mapping table.

15. The base station according to claim 10, wherein:
the processor is configured to determine to update the modulation mapping table used to communicate with the user equipment in a case that the modulation mapping table is the lower order modulation mapping table, and the channel quality information is greater than a channel quality threshold, determining, by the base station, to update the modulation mapping table, and an updated modulation mapping table is the higher order modulation mapping table.

16. The base station according to claim 10, wherein:
the transmitter is configured to send first update information to the user equipment, wherein the first update information is used to instruct the user equipment to update a modulation mapping table used to communicate with the base station.

17. The base station according to claim 16, wherein the first update information is carried by a radio resource control (RRC) message.

18. The base station according to claim 10, wherein:
the receiver is configured to receive second update information from the user equipment, wherein the second update information is used to instruct the base station to update the modulation mapping table used to communicate with the user equipment.

* * * * *